United States Patent
Yeo

(10) Patent No.: US 11,240,568 B2
(45) Date of Patent: Feb. 1, 2022

(54) APPARATUS AND METHOD FOR REPLACING AND OUTPUTTING ADVERTISEMENT

(71) Applicant: Samsung Electronics Co., Ltd., Suwon-si (KR)

(72) Inventor: Hae-dong Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 80 days.

(21) Appl. No.: 16/609,339

(22) PCT Filed: Apr. 18, 2018

(86) PCT No.: PCT/KR2018/004494
§ 371 (c)(1),
(2) Date: Oct. 29, 2019

(87) PCT Pub. No.: WO2019/022344
PCT Pub. Date: Jan. 31, 2019

(65) Prior Publication Data
US 2020/0059702 A1    Feb. 20, 2020

(30) Foreign Application Priority Data
Jul. 27, 2017  (KR) .......................... 10-2017-0095714

(51) Int. Cl.
*H04N 21/81* (2011.01)
*G06Q 30/02* (2012.01)
*H04N 21/2668* (2011.01)

(52) U.S. Cl.
CPC ....... *H04N 21/812* (2013.01); *G06Q 30/0255* (2013.01); *G06Q 30/0269* (2013.01); *G06Q 30/0272* (2013.01); *H04N 21/2668* (2013.01)

(58) Field of Classification Search
CPC ............ H04N 21/812; H04N 21/2668; H04N 21/43615; H04N 21/44218; H04N 21/251;
(Continued)

(56) References Cited

U.S. PATENT DOCUMENTS 7,266,832 B2    9/2007  Miller
10,009,636 B2 *  6/2018  Shkedi ............. H04N 21/44222
(Continued)

FOREIGN PATENT DOCUMENTS

JP    2003-522483 A    7/2003
KR   10-2007-0086829 A   8/2007
(Continued)

*Primary Examiner* — Alazar Tilahun
(74) *Attorney, Agent, or Firm* — Jefferson IP Law, LLP

(57) ABSTRACT

An electronic device and method for replacing and outputting an advertisement are provided. The electronic device includes: a memory storing at least one program; a communication unit configured to receive context data to be used to determine a state of a user, from at least one external device; and a processor configured to replace and output an advertisement by executing the at least one program, wherein the at least one program includes instructions to: acquire user state information indicating the state of the user from the received context data, based on a learning model using one or more neural networks; and perform control to replace a previously determined first advertisement with a second advertisement determined based on the user state information and to output the second advertisement.

18 Claims, 16 Drawing Sheets

(58) Field of Classification Search
CPC .......... H04N 21/4131; G06Q 30/0255; G06Q 30/0269; G06Q 30/0272; G06Q 30/02; G09F 27/00
See application file for complete search history.

(56) References Cited

U.S. PATENT DOCUMENTS

| | | |
|---|---|---|
| 2001/0054181 A1 | 12/2001 | Corvin |
| 2002/0042914 A1 | 4/2002 | Walker et al. |
| 2009/0150230 A1 | 6/2009 | Verhaegh et al. |
| 2013/0297413 A1* | 11/2013 | Pattan .................... G06Q 30/02 705/14.49 |
| 2014/0020017 A1* | 1/2014 | Stern .................. H04N 21/2747 725/34 |
| 2016/0358216 A1* | 12/2016 | Glover ............... G06Q 30/0261 |
| 2018/0115802 A1* | 4/2018 | Knox ................. H04N 21/6582 |

FOREIGN PATENT DOCUMENTS

| | | |
|---|---|---|
| KR | 10-1495297 B1 | 2/2015 |
| KR | 10-2015-0109552 A | 10/2015 |

\* cited by examiner

FIG. 5

| USER STATE INFORMATION (510) | SECOND ADVERTISEMENT(520) |
|---|---|
| PROBABILITY OF STATE IN WHICH USER IS HUNGRY : 70%<br>PROBABILITY OF STATE OF PREPARING FOOD : 20% | CHICKEN ADVERTISEMENT<br>PIZZA ADVERTISEMENT |
| PROBABILITY OF STATE IN WHICH USER IS HOT : 75%<br>CURRENT TIME: 9:30 PM<br>AVERAGE TIME WHEN LIGHTING IS TURNED OFF: 1:00 AM | BEER ADVERTISEMENT<br>ICE CREAM ADVERTISEMENT |
| CURRENT TEMPERATURE: 33 DEGREES<br>WEEKEND MORNING<br>THREE OR MORE PEOPLE PRESENT IN FRONT OF TV<br>PROBABILITY OF STATE IN WHICH USER IS HOT : 90% | WATERPARK<br>ADVERTISEMENT |
| EXERCISE EQUIPMENT HAS OPERATED FOR TWO<br>HOURS OR MORE EVERY DAY FOR RECENT THREE MONTHS | EXERCISE EQUIPMENT<br>ADVERTISEMENT<br>SPROTSWEAR<br>ADVERTISEMENT |

APPARATUS AND METHOD FOR REPLACING AND OUTPUTTING ADVERTISEMENT

TECHNICAL FIELD

The present disclosure relates to an apparatus and a method for replacing and outputting an advertisement, and more particularly, to an apparatus and a method for replacing and outputting a determined advertisement, based on user state information.

BACKGROUND ART

Conventional broadcast advertisements have a form whereby advertisements previously determined by a broadcast station are output collectively. However, along with the development of the Internet, instead of outputting advertisements previously determined by a broadcast station, a system for outputting user customized advertisements has been introduced. When user customized advertisements are output, it is important to determine advertisements to be output according to a user, and thus, a method capable of outputting advertisements by more accurately targeting the user is required.

DESCRIPTION OF EMBODIMENTS

Technical Problem

The disclosed various embodiments can provide an apparatus and a method for outputting an advertisement, which can be of more interest to a user in a current state, by replacing and outputting an advertisement based on user state information.

Solution to Problem

According to some embodiments, there is provided an electronic device including: a memory storing at least one program; a communication unit configured to receive context data to be used to determine a state of a user, from at least one external device; and a processor configured to replace and output an advertisement by executing the at least one program, wherein the at least one program includes: acquiring user state information indicating the state of the user from the received context data, based on a learning model using one or more neural networks; and performing control so as to replace a previously determined first advertisement with a second advertisement determined based on the user state information and to output the second advertisement.

The first advertisement may be an advertisement previously determined by a broadcasting station to be output through the electronic device, and the second advertisement may be an advertisement determined to be output instead of the first advertisement, as an advertisement targeted at the user.

The learning model may be determined by learning a state of the user in response to an input of context data to the one or more neural networks.

The learning model may be updated when the at least one external device connected to the electronic device is changed.

The user state information may be differently determined according to at least one of a type of the at least one external device, a state of the at least one external device, and a value of the context data.

The at least one program may further include instructions configured to acquire view history information, wherein the second advertisement is determined based on the user state information and the view history information.

The at least one external device may include at least one of a home appliance, a cooking appliance, a mobile device, a wearable device, acoustic equipment, exercise equipment, a lighting device, and a sensor connected to the electronic device via a network.

The instructions to perform the control to replace with the second advertisement and output the second advertisement may include: instructions to recognize a time point when the first advertisement starts; and instructions to perform control to replace the first advertisement with the second advertisement and output the second advertisement from the recognized time point.

The instructions to perform the control to replace with the second advertisement and output the second advertisement may include: instructions to transmit the user state information to an external server; instructions to receive information about the second advertisement determined based on the user state information from the external server; and instructions to replace the first advertisement with the second advertisement based on the received information about the second advertisement and output the second advertisement.

The second advertisement may be determined based on price information transmitted from each of one or more advertisers accessing the external server.

The at least one program may further include instructions to: receive an input of changing a channel; and perform control to continuously output, on a second channel, the second advertisement being output on a first channel, when the channel is changed from the first channel to the second channel in response to the received input.

According to some embodiments, there is provided a method, performed by an electronic device, of replacing and outputting an advertisement, the method including: receiving context data used to determine a state of a user from at least one external device; acquiring user state information indicating the state of the user from the received context data, based on a learning model using one or more neural networks; and performing control to replace a previously determined first advertisement with a second advertisement determined based on the user state information and output the second advertisement.

MODE OF DISCLOSURE

Figure 1:
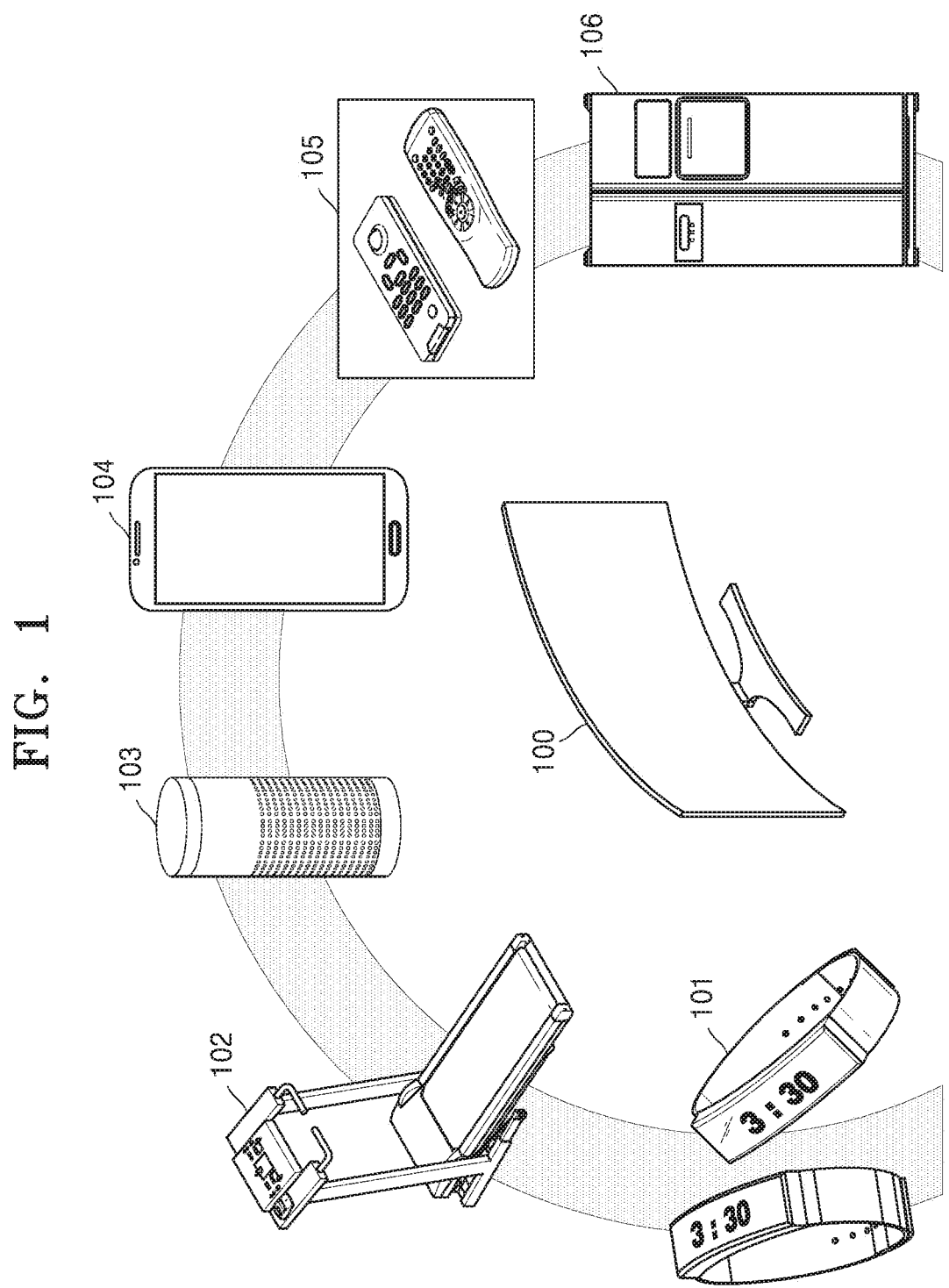
FIG. 1 illustrates an example in which an electronic device replaces and outputs an advertisement based on user state information, according to some embodiments.

Hereinafter, embodiments of the present disclosure will be described in detail with reference to the accompanying drawings such that those of ordinary skill in the art to which the present disclosure belongs could easily carry out the embodiments. However, the present disclosure could be implemented in various different forms and is not limited to the embodiments described herein. In addition, in the drawings, parts irrelevant to the description are omitted to clearly describe the present disclosure, and like reference numerals denote like elements throughout the specification.

Throughout the specification, when it is described that a certain part is "connected" to another part, it should be understood that the certain part may be "directly connected" or "electrically connected" to another part via another element in the middle. In addition, when a certain part "includes" a certain component, this indicates that the part may further include another component instead of excluding another component unless there is different disclosure.

Hereinafter, the present disclosure will be described in detail with reference to the accompanying drawings.

FIG. 1 illustrates an example in which an electronic device replaces and outputs an advertisement based on user state information, according to some embodiments.

Referring to FIG. 1, an electronic device 100 may receive a broadcast program from a broadcasting station server or a content provider server and display the received broadcast program. In addition, the electronic device 100 may receive an advertisement from the broadcasting station server or an advertisement provision server in the middle of displaying the broadcast program or after the broadcast program ends and display the received advertisement.

When the advertisement is displayed, the electronic device 100 may replace a first advertisement previously determined by the broadcasting station server with a second advertisement determined in consideration of a state of a user and display the second advertisement. In this case, the replacing of the first advertisement with the second advertisement and displaying of the second advertisement may indicate displaying the second advertisement instead of the first advertisement. For example, the electronic device 100 may recognize a time point when displaying of the first advertisement starts and display the second advertisement instead of the first advertisement from the recognized time point.

The electronic device 100 may receive context data from at least one external device (101, 102, 103, 104, 105, and 106) connected to the electronic device 100 via a network. The context data received from the at least one external device (101 to 106) may indicate data to be used to determine a state of the user. The electronic device 100 may determine a state of the user from the received context data and perform a control so as to output an advertisement from which a relatively high advertising effect can be expected, in consideration of user state information indicating the state of the user.

In addition, the electronic device 100 may acquire the user state information indicating the state of the user from the received context data by using a learning model using one or more neural networks.

The neural network may be a set of algorithms of learning a state of a user from predetermined context data input to the neural network, based on an artificial intelligence. For example, the neural network may learn an associative relationship between context data and a state of a user based on supervised learning having predetermined context data as an input value and on unsupervised learning of discovering a pattern to determine the state of the user by autonomously learning a type of context data necessary to determine the state of the user without particular supervision. Alternatively, for example, the neural network may learn an associative relationship between context data and a state of a user by using reinforcement learning using a feedback on whether a result of determining a state of the user according to learning is right.

The user state information may include at least one of information indicating a motion state of the user, information indicating a biorhythm of the user, and information indicating a surrounding environment of the user but is not limited thereto. The information indicating a motion state of the user may include information indicating a state in which the user is exercising, sleeping, cooking, cleaning, or the like but is not limited thereto. In addition, the information indicating a biorhythm of the user may include information indicating, e.g., an average sleeping time and an average wakeup time of the user, a mealtime of the user, and the like but is not limited thereto. The information indicating a surrounding environment of the user indicates environment information within a predetermined radius from the user and may include, for example, weather information, temperature information, humidity information, illuminance information, a noise level, sound information, and the like but is not limited thereto.

The electronic device 100 may be a device including a display, such as a TV, a smartphone, a personal computer (PC), a tablet PC, a cellular phone, a digital camera, a camcorder, a laptop computer, an e-book terminal, a digital broadcast terminal, a personal digital assistant (PDA), a portable multimedia player (PMA), a navigation machine, an MP3 player, or the like but is not limited thereto. Alternatively, the electronic device 100 may be a digital broadcast receiver, a set-top box, or an Internet protocol (IP) set-top box capable of performing digital broadcast reception. The set-top box or the IP set-top box may be a device having a communication function and a data processing function as a device for providing a multimedia communication service by being connected to a device including a display.

The electronic device 100 may communicate with at least one external device and a server (not shown) connected to the electronic device 100 via the network, to acquire user state information.

The external device with which the electronic device 100 communicates to acquire user state information may include at least one of home appliances such as a refrigerator, a washing machine, an air conditioner, and a fan, cooking appliances such as a gas stove, an oven, a microwave oven, and a rice cooker, a lighting device, acoustic equipment, a mobile device, a wearable device, and a sensor. For example, the electronic device 100 may receive data indicating a heart rate, a sleeping time, an exercise amount, consumed calories, and the like of the user from a wearable device worn by the user and receive data indicating whether each device is operating at present from a home appliance, a cooking appliance, or acoustic equipment. In addition, the electronic device 100 may receive data indicating a current use state of a mobile device from the mobile device of the user. For example, the electronic device 100 may receive data indicating whether the user is busy on a call at present, is viewing video content by using the mobile device, is listening to music, is surfing a web, or the like but is not limited thereto.

The network includes a local area network (LAN), a wide area network (WAN), a value added network (VAN), a mobile radio communication network, a satellite communication network, and a combination thereof, is a data communication network of an inclusive meaning, which enables each network configuration subject to smoothly communicate with each other, and may include a wired Internet, a wireless Internet, and a mobile wireless communication network. Wireless communication may include, for example, wireless LAN (Wi-Fi), Bluetooth, Bluetooth low energy, Zigbee, Wi-Fi Direct (WFD), ultra wideband (UWB), infrared data association (IrDA), near field communication (NFC), or the like but is not limited thereto.

Figure 2:
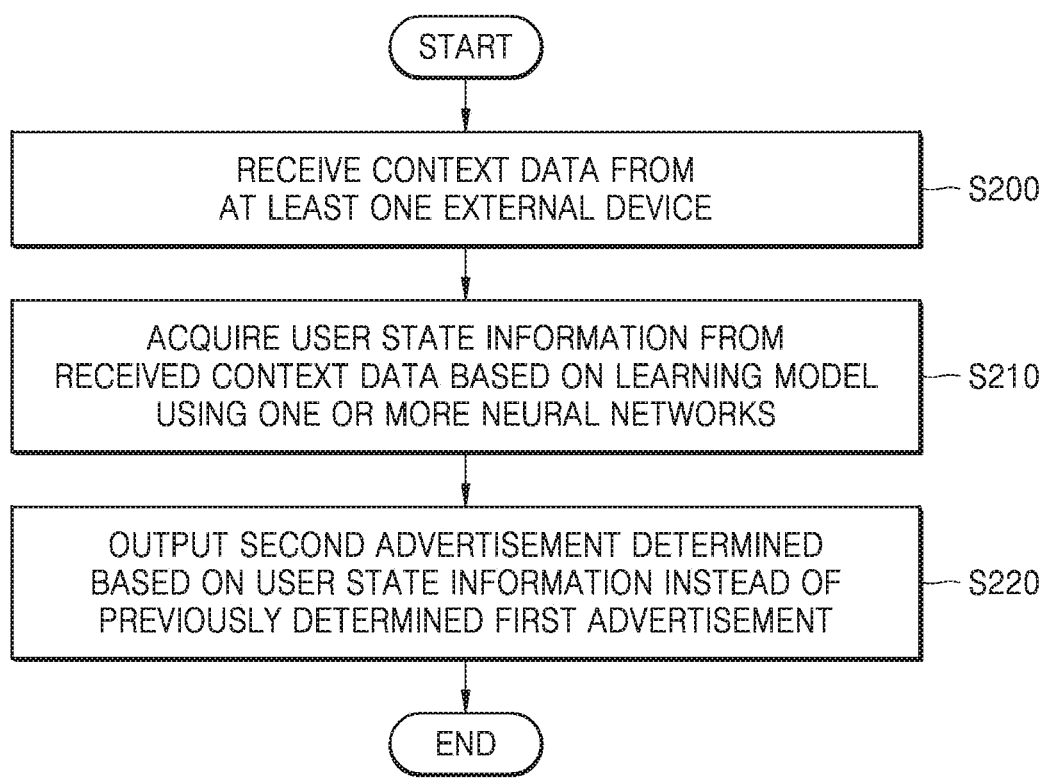
FIG. 2 is a flowchart of a method, performed by an electronic device, of replacing and outputting an advertisement, according to some embodiments.

FIG. 2 is a flowchart of a method, performed by an electronic device, of replacing and outputting an advertisement, according to some embodiments.

In operation S200, the electronic device 100 receives context data from at least one external device. The external device is a device connected to the electronic device 100 via a network and may indicate a device located within a predetermined radius from the electronic device 100. For example, when the electronic device 100 is a TV provided to home, the external device may include at least one of home appliances (a washing machine, a refrigerator, a cleaner, an air conditioner, and the like), cooking appliances (e.g., a gas stove, a microwave oven, an oven, and the like), a mobile device (e.g., a cellular phone of the user), a wearable device (e.g., a smart watch), acoustic equipment (e.g., a speaker), a lighting device, sensors (e.g., a temperature sensor, a humidity sensor, a motion sensor, and the like), and exercise equipment (e.g., a treadmill, an indoor bicycle, and the like). In this case, the context data received from the at least one external device may be data to be used for the electronic device 100 to determine a state of the user. For example, the context data may include information indicating operating states of the home appliances, the cooking appliances, the acoustic equipment, and the exercise equipment, information indicating an on/off state of the lighting device, an operating state and the like of the cellular phone and/or the wearable device, a temperature, a humidity, a time, a motion of the user, a heart rate of the user, an image captured by a camera provided to home, and the like but is not limited thereto, and may include all data usable to determine a state of the user.

In operation S210, the electronic device 100 acquires user state information indicating a state of the user from the received context data by using a learning model using one or more neural networks.

According to some embodiments, the electronic device 100 may learn an associative relationship between the context data and the state of the user by using the one or more neural networks. The electronic device 100 may learn the associative relationship between the context data and the state of the user in response to an input of the context data received from the at least one external device to the one or more neural networks and store, in a memory of the electronic device 100, a learning model which has learned the associative relationship between the context data and the state of the user. Alternatively, according to an embodiment, an operation of determining the state of the user may be performed an external server for the electronic device 100. In this case, the electronic device 100 may transmit the context data received from the at least one external device to the external server and receive user state information indicating a state of the user from the external server. A detailed description of the operation of learning the associative relationship between the context data and the state of the user will be made below with reference to FIG. 3.

The user state information is information indicating a state of the user, and a form of the user state information may vary according to embodiments. For example, the user state information may indicate a state of the user with a probability value (e.g., a probability of a state in which the user is hungry is 70%), with a statistical value (e.g., the user uses exercise equipment average 20 times or more per month), or the like but is not limited thereto.

In operation S230, the electronic device 100 performs a control so as to replace a previously determined first advertisement with a second advertisement determined based on the user state information and to output the second advertisement.

The first advertisement may indicate an advertisement previously determined by a broadcasting station to be output through the electronic device 100, and the second advertisement may indicate an advertisement determined so as to be output instead of the first advertisement. For example, when considering user state information indicating that a probability of a state in which the user is hungry is 85%, an advertising effect of a food advertisement may be higher than an advertising effect of another product advertisement. Therefore, even though it is previously determined by a broadcasting station to output a golf product advertisement through the electronic device 100, the electronic device 100 may perform a control so as to replace the golf product advertisement with a food advertisement and to output the food advertisement.

The electronic device 100 may transmit the user state information to an advertisement selection server and receive, from the advertisement selection server, information about the second advertisement determined based on the user state information. The advertisement selection server is a server for selecting the second advertisement to be output instead of the first advertisement and may be a server operated by the broadcasting station, or may be a server operated by a third party according to an embodiment. One or more advertisers may transmit price information to the advertisement selection server to make an advertisement of an advertiser be selected as the second advertisement. The advertisement selection server may determine the second advertisement based on the price information received from the one or more advertisers.

The electronic device 100 may recognize a time point when the first advertisement starts and perform a control so as to replace the first advertisement with the second advertisement and to output the second advertisement from the recognized time point. Accordingly, the electronic device 100 may prevent changing to the second advertisement in the middle of outputting the first advertisement.

The electronic device 100 may perform a control so as to output the determined second advertisement by considering not only the user state information but also view history information. Accordingly, the electronic device 100 may improve an advertising effect by outputting a more effective advertisement by considering a current state of the user.

In addition, the electronic device 100 may perform a control to continuously output, on a second channel, the second advertisement being output on a first channel, when a channel is changed from the first channel to the second channel in response to an input of changing the channel. Accordingly, the electronic device 100 may improve an advertising effect of the second advertisement by allowing the user to view the second advertisement from the start to the end thereof.

The electronic device 100 may receive and output, in real-time, the second advertisement from a server for providing the second advertisement. Alternatively, according to an embodiment, the electronic device 100 may previously receive a portion of the second advertisement from the server and store the received portion of the second advertisement in a memory, and receive and output, in real-time, the remaining portion of the second advertisement, which is not stored in the memory, from a server while outputting the second advertisement stored in the memory.

Figure 3:
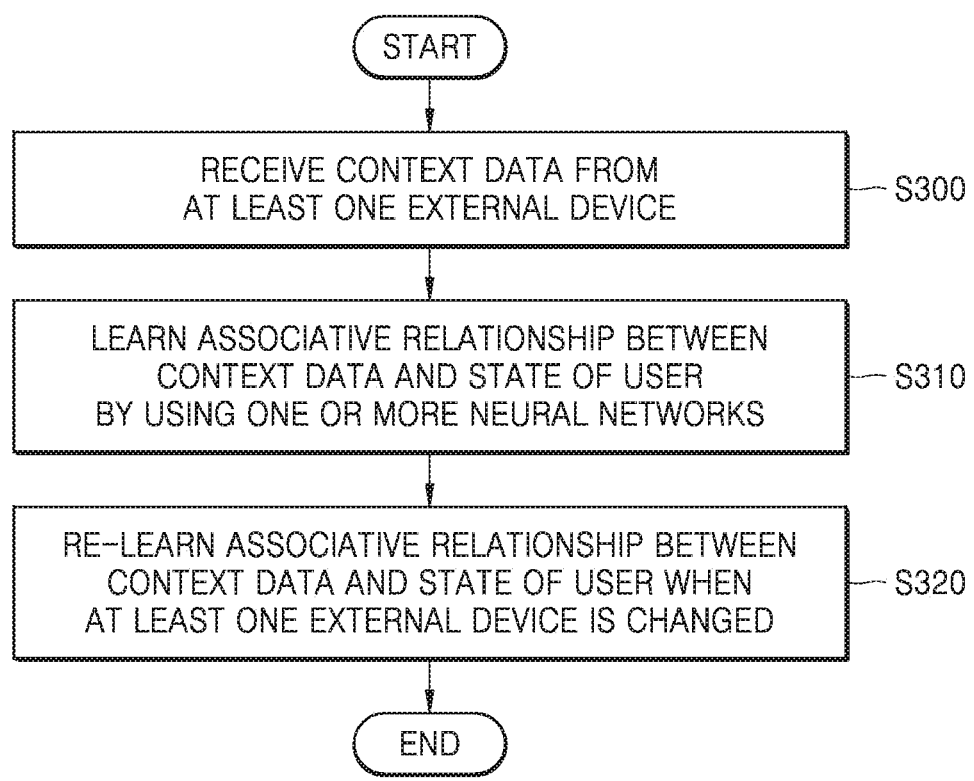
FIG. 3 is a flowchart of a method, performed by an electronic device, of learning user state information, according to some embodiments.

FIG. 3 is a flowchart of a method of learning user state information, according to some embodiments.

According to some embodiments, the electronic device 100 may learn a state of a user from context data received from at least one external device, by using one or more neural networks.

Referring to FIG. 3, in operation S300, the electronic device 100 may receive, from at least one external device, context data to be used to determine a state of the user. For example, the electronic device 100 may receive data indicating operating states of devices from home appliances including a refrigerator, a washing machine, a cleaner, an air conditioner, and the like and receive data indicating operating states of devices from cooking appliances including a rice cooker, an oven, a gas stove, and the like. In addition, the electronic device 100 may receive current temperature data, humidity data, motion data of the user, and the like from a temperature sensor, a humidity sensor, a motion sensor, and the like but is not limited thereto.

In operation S310, the electronic device 100 may learn an associative relationship between the received context data and the state of the user by using the one or more neural networks.

To determine the state of the user, the context data received from the at least one external device may be used. For example, based on the context data received from the at least one external device, whether the user is hungry at present, is exercising, is cleaning, is preparing food, or the like may be determined. Which context data is used to determine a state of the user may be determined according to learning based on a preset criterion. For example, supervised learning having predetermined context data received from an external device as an input value and unsupervised learning of discovering a pattern to detect a state of the user by autonomously learning a type of context data necessary to detect the state of the user without particular supervision may be used to determine the state of the user. Alternatively, for example, reinforcement learning using a feedback on whether a result of determining a state of the user according to learning is right may be used to determine the state of the user. Accordingly, the electronic device 100 may store, in a memory, a learning model which has learned the associative relationship between the context data and the state of the user by using one or more neural networks and determine a state of the user from context data received in real-time based on the learning model stored in the memory.

In operation S320, the electronic device 100 may re-learn an associative relationship between context data and a state of the user when the at least one external device connected to the electronic device 100 via a network is changed. Which context data is used to determine the state of the user may be determined according to learning based on a preset criterion. Therefore, when an external device for providing context data is changed (e.g., when a new external device is added, or when an existing external device is removed), the electronic device 100 may update the learning model by re-learning a state of the user. The electronic device 100 may store the updated learning model in the memory, and determine a state of the user from context data received in real-time, by using the updated learning model.

FIG. 3 illustrates learning an associative relationship between context data and a state of a user, but the present embodiment is not limited thereto. For example, the one or more neural networks may learn an associative relationship between context data and a user-preferred advertisement by using the context data as input data. For example, the one or more neural networks may learn an associative relationship between context data and a user-preferred advertisement category. Accordingly, the electronic device 100 may acquire information about the user-preferred advertisement category from the context data and output, instead of a first advertisement, a second advertisement determined based on the user-preferred advertisement category.

Figure 4:
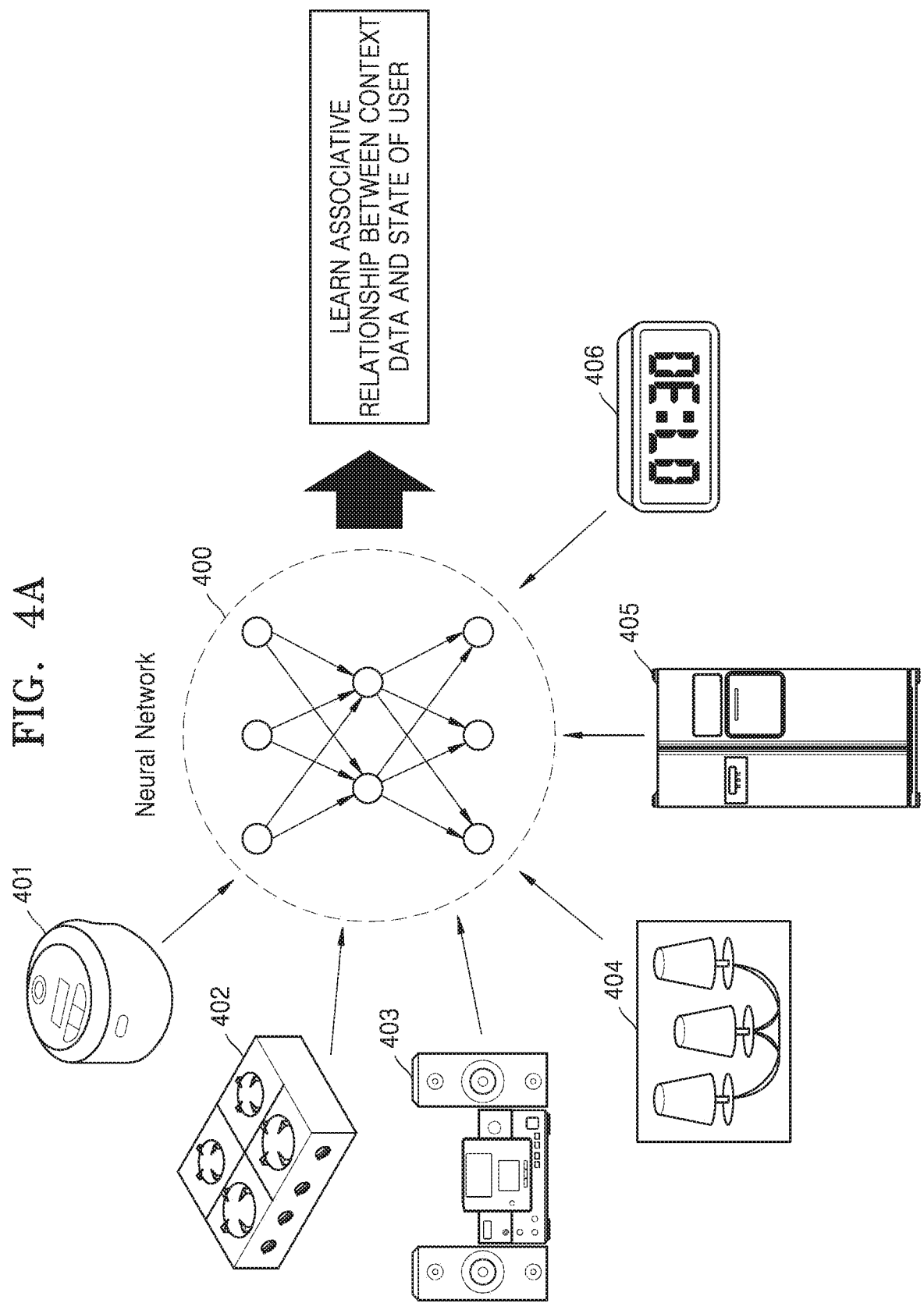
FIGS. 4A and 4B illustrate examples of a neural network used to detect user state information, according to some embodiments.

FIGS. 4A and 4B illustrate examples of a neural network used to determine a state of a user, according to some embodiments.

Referring to FIG. 4A, a neural network 400 may learn an associative relationship between context data and a state of the user by using, as an input value, context data received from at least one of external devices 401 to 406. For example, the neural network 400 may learn an associative relationship between a current state of the user and an operating state of an electrical rice cooker 401, an operating state of a gas stove 402, an operating state of acoustic equipment 403, an on/off state of a lighting device 404, a door open/close state of a refrigerator 405, time information acquired from a watch 406, and the like but is not limited thereto. The neural network 400 may dynamically select context data received from at least one external device to learn an associative relationship between the context data and a state of the user.

According to some embodiments, an operation of learning an associative relationship between context data and a state of the user by using at least one neural network may be performed in advance. In addition, the electronic device 100 may previously store, in a memory, a learning model which has learned an associative relationship between context data and a state of the user and acquire user state information from context data received from at least one external device by using the stored learning model.

For example, referring to FIG. 4B, the electronic device 100 may acquire information indicating that a probability of a state in which the user is hungry is 75% from data indicating that the electrical rice cooker 401 is not operating, data indicating that the gas stove 402 is not operating, data indicating that the acoustic equipment 403 is in an off state, data indicating that the lighting device 404 is turned on, data indicating that the door of the refrigerator 405 was opened before one minute and before 30 minutes, current time data, and the like by using the learning model. In this case, a second advertisement determined based on user state information may be an advertisement which can be concerned by the hungry user (e.g., a food advertisement) but is not limited thereto.

In addition, the electronic device 100 may update the learning model when at least one external device connected to the electronic device 100 via a network is changed. For example, when the acoustic equipment 403 connected to the electronic device 100 is removed, or when a new external device (e.g., an oven or a cleaner) is added, the learning model may be updated by re-learning an associative relationship between context data received from at least one external device and a state of the user.

According to an embodiment, an operation of learning a state of the user by using at least one neural network and updating the learning model may be performed by an external server. For example, an operation of learning a state of the user in response to an input of context data received from several external devices existing at home to one or more neural networks may require a complex computation amount. Therefore, the external server may perform an operation of learning a state of the user and updating the learning model, thereby enabling a computation amount which an electronic device should perform to be reduced, and enabling a state of the user to be more quickly determined.

Figure 5:
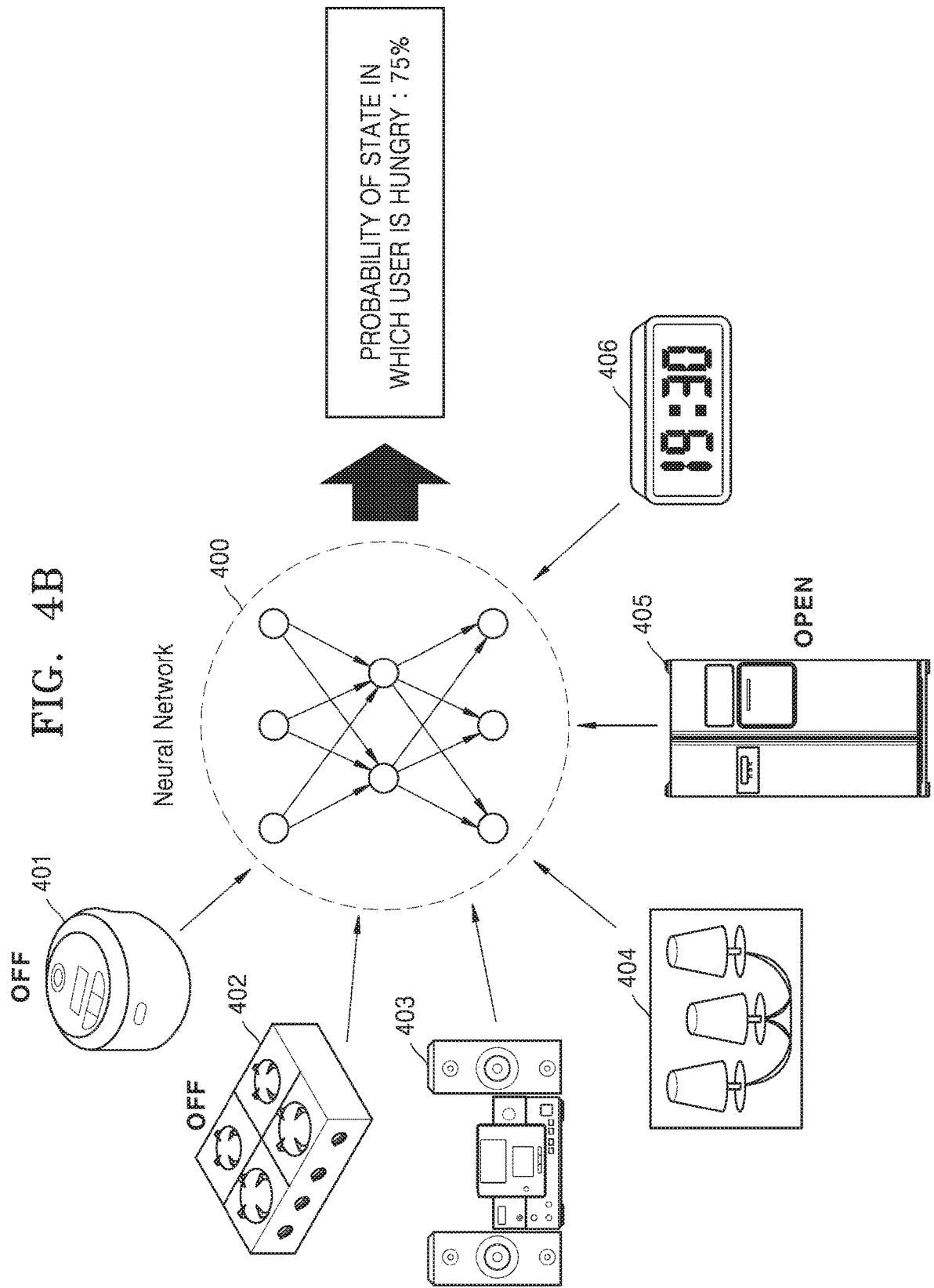
FIG. 5 is a table showing examples of a second advertisement determined based on user state information, according to some embodiments.

FIG. 5 is a table showing examples of a second advertisement determined based on user state information, according to some embodiments.

According to some embodiments, the second advertisement may be differently determined according to the user state information. A first advertisement may be an advertisement previously determined by a broadcasting station to be output through the electronic device 100, and the second advertisement may be an advertisement determined to be output instead of the first advertisement, as an advertisement targeted at a user. In this case, the second advertisement may be an advertisement from which a relatively high advertising effect can be expected, based on the user state information.

Referring to FIG. 5, a table 500 may include a user state information field 501 and a second advertisement field 502. For example, when a probability of a state in which the user is hungry is 70%, and a probability of a state in which the user prepares food at present is 20%, this may indicate a state in which the user is hungry at present but has not determined a meal menu. In this case, an advertisement from which a higher advertising effect can be expected may be a food advertisement such as a chicken advertisement or a pizza advertisement.

In addition, for example, when a probability of a state in which the use is hot is 75%, a current time is 9 and half post meridiem, and an average lights-out time of home lighting for recent one month is 1 o'clock ante meridiem, the second advertisement targeted at the user may be a beer advertisement or an ice cream advertisement but is not limited thereto.

In addition, when a current temperature is 33 degrees, three or more people exist at the front of the electronic device 100 in the morning of a weekend, and a probability of a state in which the use is hot is 90%, the second advertisement determined based on the user state information may be a waterpark advertisement but is not limited thereto.

As another example, when exercise equipment has operated for two hours or more at every day for recent three months at home of the user, the second advertisement determined based on the user state information may be an exercise equipment advertisement, a sportswear advertisement, or the like but is not limited thereto.

Therefore, according to some embodiments, the electronic device 100 may replace the first advertisement with the second advertisement determined based on the user state information and output the second advertisement, thereby enabling an advertisement which can be more concerned by the user to be provided, and enabling an advertising effect of the second advertisement to be improved.

Figure 6:
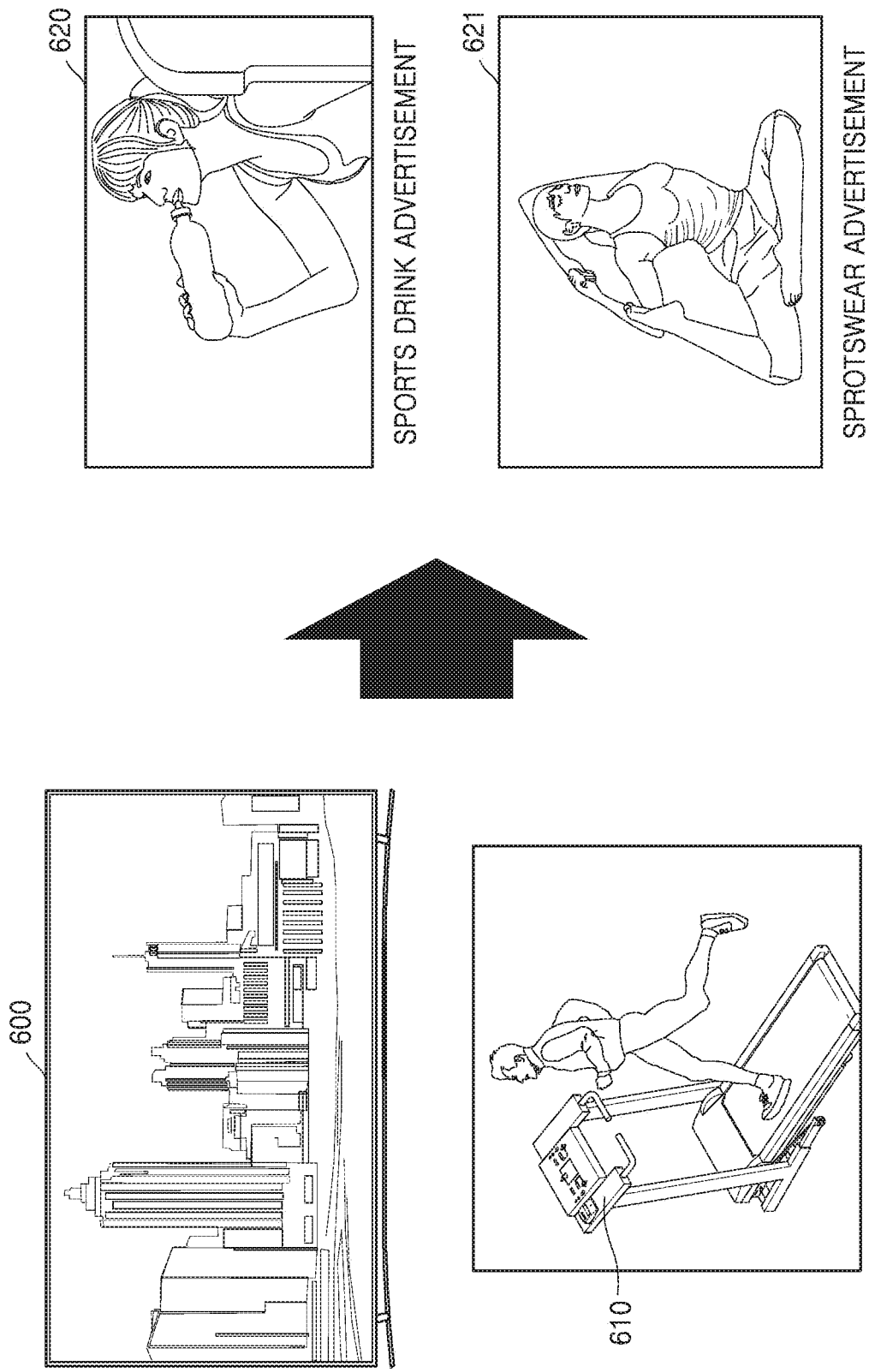
FIG. 6 illustrates an example in which an electronic device replaces and outputs an advertisement, according to some embodiments.

FIG. 6 illustrates an example in which an electronic device replaces and outputs an advertisement, according to some embodiments.

Referring to FIG. 6, the electronic device 100 may be a TV 600, and a user may watch the TV 600 while exercising with exercise equipment 610 at home. For example, the user is watching a program A being broadcast on the TV 600, and a first advertisement previously determined by a broadcasting station to be output through the TV 600 when the program A ends may be a cleaner advertisement. In this case, the electronic device 100 may output, instead of the cleaner advertisement, a second advertisement determined based on user state information indicating that the user is exercising. For example, the second advertisement determined based on the user state information indicating that the user is exercising may include a sports drink advertisement 620 or a sportswear advertisement 621 but is not limited thereto.

According to some embodiments, the electronic device 100 may recognize a time point when the program A ends and the first advertisement starts. In addition, the electronic device 100 may replace the first advertisement with the second advertisement and output the second advertisement. Accordingly, the electronic device 100 may prevent changing to the second advertisement in the middle of outputting the first advertisement and allows the user to view the second advertisement from the start to the end thereof.

Figure 7:
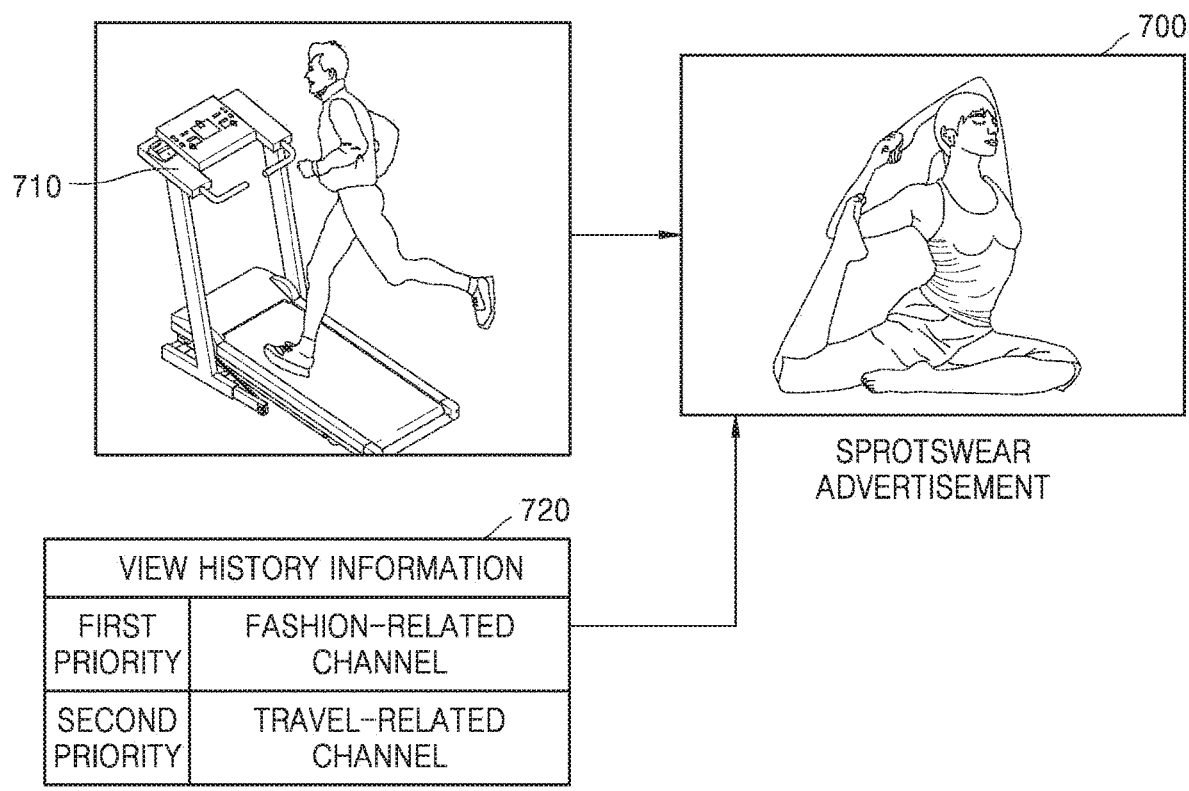
FIG. 7 illustrates an example in which a second advertisement is determined based on user state information and view history information, according to some embodiments.

FIG. 7 illustrates an example in which a second advertisement is determined based on user state information and view history information, according to some embodiments.

According to some embodiments, the electronic device 100 may acquire view history information. For example, the electronic device 100 may acquire information about whether a user frequently watches a golf-related channel, a movie-related channel, an education-related channel, or the like but is not limited thereto. When the user frequently watches a golf-related channel, the user may be interested in a golf product advertisement. Alternatively, when the user frequently watches a movie-related channel, the user may be interested in a travel advertisement.

In addition, the electronic device 100 may perform a control so as to output, instead of a first advertisement, a second advertisement determined by considering not only user state information but also the view history information.

Referring to FIG. 7, when the electronic device 100 is a TV, the user may be watching a program being output through the TV while exercising with exercise equipment 710. In this case, a control may be performed to output the second advertisement determined by considering both user state information indicating that the user is exercising and view history information 720 instead of the first advertisement previously determined by a broadcasting station to be output through the TV. For example, when the user frequently watches a fashion-related channel and a travel-related channel at ordinary times, a sportswear advertisement 700 may be determined as the second advertisement based on the user state information indicating that the user is exercising and view history information indicating that the user frequently watches a fashion-related channel. Accordingly, the electronic device 100 may determine the second advertisement by considering both the user state information and the view history information, thereby enabling an advertisement which can be more concerned by the user to be output as the second advertisement.

Figure 8:
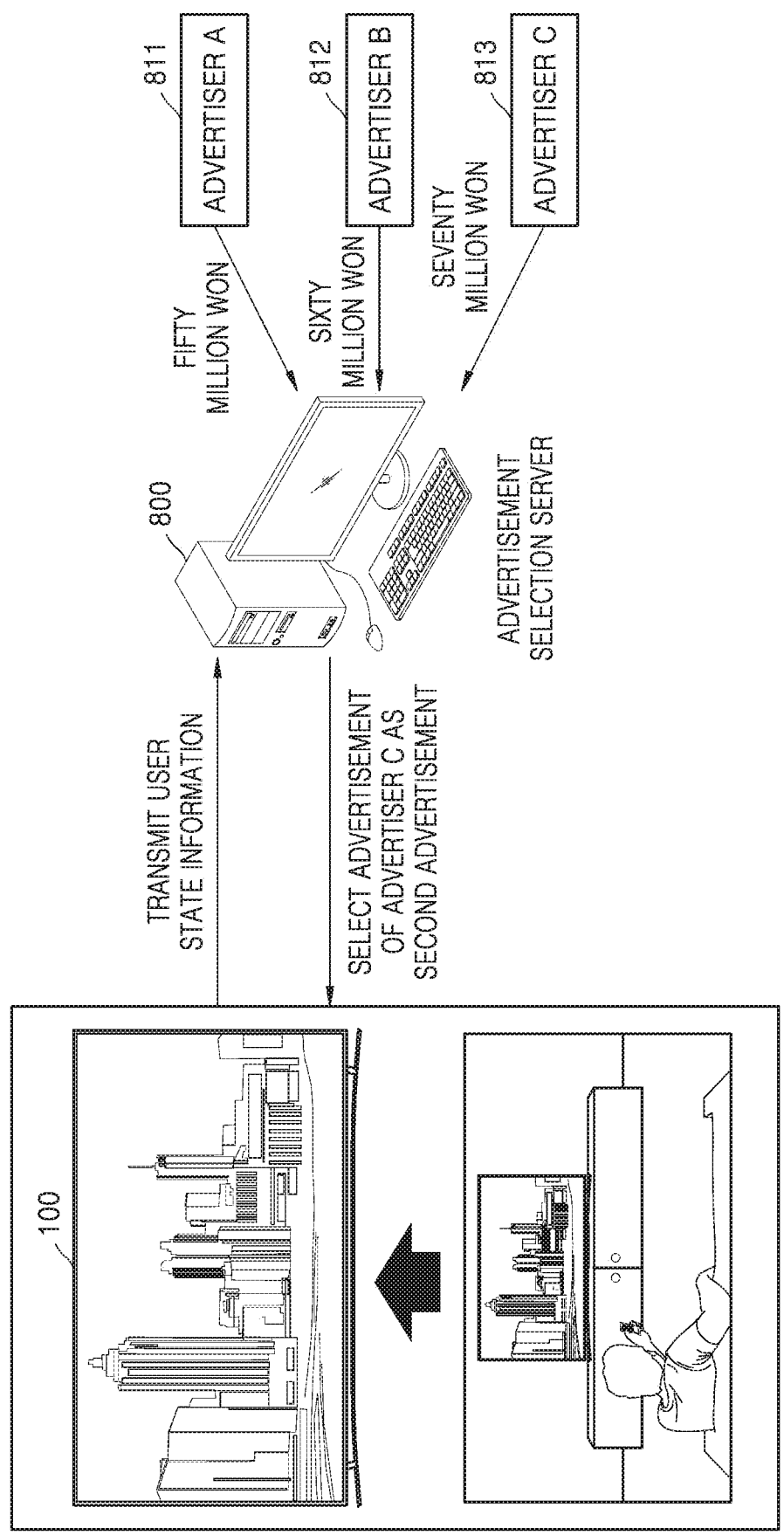
FIG. 8 illustrates an example in which a second advertisement is determined, according to some embodiments.

FIG. 8 illustrates an example in which a second advertisement is determined, according to some embodiments.

Referring to FIG. 8, according to some embodiments, the electronic device 100 may transmit user state information to an advertisement selection server 800.

For example, the electronic device 100 may transmit, to the advertisement selection server 800, information indicating that a probability of a state in which a user is hungry at present is 85% or more, and a probability of a state in which the user is preparing a meal is 20% or less. Then, one or more advertisers accessing the advertisement selection server 800 may check the user state information received to the advertisement selection server 800. In this case, an advertiser A 811, an advertiser B 812, and an advertiser C 813 who want to advertise food may advertise the food by targeting the user based on the user state information indicating that the probability of a state in which the user is hungry is 85% or more, and the probability of a state in which the user is preparing a meal is 20% or less. Accordingly, the advertiser A 811, the advertiser B 812, and the advertiser C 813 may predict an advertising effect based on the user state information and provide, to the advertisement selection server 800, price information on which a predicted result has been reflected. For example, the advertiser A 811 who wants to advertise cookies, the advertiser B 812 who wants to advertise chicken, and the advertiser C 813 who wants to advertise pizza may have an intention to pay fifty million Won, sixty million Won, and seventy million Won, respectively, in order to target the user. In this case, the price information may be received from servers of the advertiser A 811, the advertiser B 812, and the advertiser C 813 or terminals of the advertiser A 811, the advertiser B 812, and the advertiser C 813 but is not limited thereto.

The advertisement selection server 800 which has received the price information from the advertiser A 811, the advertiser B 812, and the advertiser C 813 may determine the second advertisement based on the price information received from the advertisers. For example, the advertisement selection server 800 may determine, as the second advertisement, an advertisement of an advertiser who has proposed the highest price. For example, referring to FIG. 8, the advertisement selection server 800 may determine, as the second advertisement, a pizza advertisement of the advertiser C 813 who has proposed seventy million Won and transmit information about the pizza advertisement of the advertiser C 813 to the electronic device 100. Accordingly, the electronic device 100 may output the pizza advertisement of the advertiser C 813 instead of a first advertisement previously determined by a broadcasting station so as to output through the electronic device 100.

Figure 9:
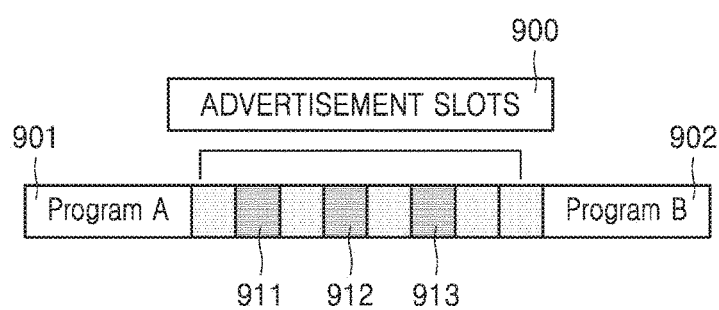
FIG. 9 illustrates an example where there are a plurality of advertisement slots in which an advertisement may be replaced and output, according to some embodiments.

FIG. 9 illustrates an example where there are a plurality of advertisement slots in which an advertisement may be replaced and output, according to some embodiments.

According to some embodiments, a plurality of advertisements may be output after a broadcast program being output through the electronic device 100 ends and before a next broadcast program is output. For example, when nine advertisements are to be output between a broadcast program A and a broadcast program B, nine advertisement slots may exist between the broadcast program A and the broadcast program B. In addition, one or more previously determined advertisement slots among a plurality of advertisement slots may be slots in which an advertisement may be replaced. A slot in which an advertisement may be replaced may indicate an advertisement slot in which a first advertisement previously determined by a broadcasting station to be output through the electronic device 100 may be replaced with a second advertisement and output. A slot in which an advertisement may be replaced may be previously determined by a broadcasting station or a content provider, and an advertiser who wants to provide an advertisement by targeting a user may want to insert the advertisement into the slot in which an advertisement may be replaced.

For example, referring to FIG. 9, eight advertisement slots 910 may be included between a broadcast program A 901 and a broadcast program B 902 to be output through the electronic device 100. In this case, a second slot 911, a fourth slot 912, and a sixth slot 913 among the advertisement slots 910 may be slots in which an advertisement may be replaced.

According to some embodiments, the electronic device 100 may transmit real-time user state information to an advertisement selection server. In addition, one or more advertisers accessing the advertisement selection server may determine a price for a specific advertisement slot determined based on the user state information and transmits price information indicating the determined price to the advertisement selection server. The advertisement selection server may determine a second advertisement to be inserted into a corresponding advertisement slot, based on the price information received from the one or more advertisers.

For example, when the user who has existed on the front of the electronic device 100 moves to another space immediately before a time point corresponding to the second slot 911, no watching user exists even though an advertisement is output at the time point corresponding to the second slot 911, and thus no advertisers may transmit price information for the second slot 911 to the advertisement selection server. In this case, the electronic device 100 may output the previously determined first advertisement at the time point corresponding to the second slot 911. In addition, when a plurality of advertisers transmit price information for the fourth slot 912 to the advertisement selection server based on user state information at a time point corresponding to the fourth slot 912, the advertisement selection server may determine, as the second advertisement to be output in the fourth slot 912, an advertisement of an advertiser who has proposed the highest price. According to the method described above, the advertisement selection server may determine the second advertisement to be inserted into each of the second slot 911, the fourth slot 912, and the sixth slot 913, based on the price information received from the one or more advertisers accessing the advertisement selection server.

Alternatively, according to an embodiment, the second advertisement to be inserted into each of the second slot 911, the fourth slot 912, and the sixth slot 913 may be previously determined instead of being determined in real-time. For example, the electronic device 100 may transmit real-time user state information or average user state information for a predetermined period to the advertisement selection server. For example, the electronic device 100 may transmit, to the advertisement selection server, information indicating that the user watches news while exercising between 9 o'clock and 10 o'clock post meridiem at every day for recent one week. In this case, the one or more advertisers accessing the advertisement selection server may transmit, to the advertisement selection server, price information for a desired slot among a plurality slots in which an advertisement may be replaced, based on average user state information for recent one week. The advertisement selection server may previously determine the second advertisement to be inserted into a specific slot, based on the price information transmitted from the one or more advertisers.

Figure 10:
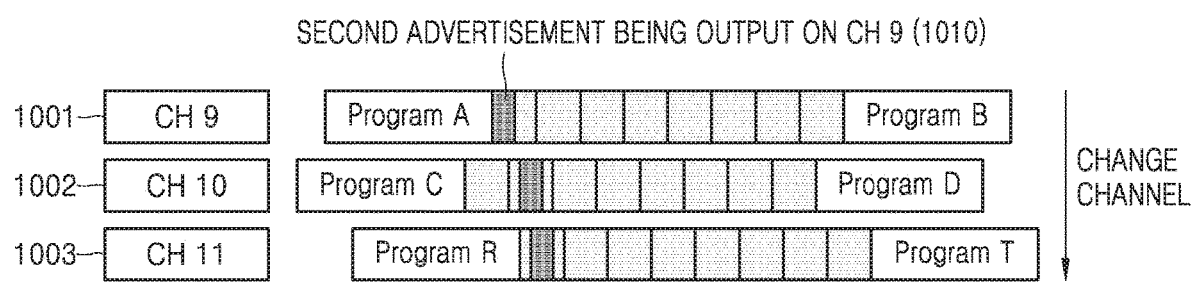
FIG. 10 illustrates an example in which a second advertisement being output is continuously output when a channel is changed, according to some embodiments.

FIG. 10 illustrates an example in which a second advertisement being output is continuously output when a channel is changed, according to some embodiments.

A user may change a channel in the middle of watching a broadcast program of a specific channel. According to some embodiments, the electronic device 100 may perform a control so as to seamlessly output the second advertisement being output even though a channel is changed when the second advertisement targeted at the user is being output through the channel which the user is watching.

For example, referring to FIG. 10, the user may change a channel 9 1001 while watching the channel through the electronic device 100. In addition, a second advertisement 1010 determined by targeting the user may be being output through the channel 9 1001. In this case, the electronic device 100 may perform a control so as to continuously output the second advertisement 1010, which has been being output through the channel 9 1001, in a channel 10 1002 and a channel 11 1003 even though a channel is changed from the channel 9 1001 to the channel 10 1002 and from the channel 10 1002 to the channel 11 1003.

When the channel is changed from the channel 9 1001 to the channel 10 1002 and from the channel 10 1002 to the channel 11 1003 in response to a user input of changing the channel, the electronic device 100 may determine whether a broadcast program or an advertisement is being output through the channel 10 1002 and the channel 11 1003. For example, the electronic device 100 may determine whether an image being output is a broadcast program or an advertisement, by sampling frames of images being output through the channel 10 1002 and the channel 11 1003. Accordingly, when a broadcast program ends and an advertisement is being output through the channel 10 1002 and the channel 11 1003, the electronic device 100 may perform a control so as to continuously output the second advertisement 1010, which is being output through the channel 9 1001, in the channel 10 1002 and the channel 11 1003. Therefore, the electronic device 100 may allow the user to view the second advertisement from the start to the end thereof, thereby enabling an advertising effect of the second advertisement to be improved.

Figure 11:
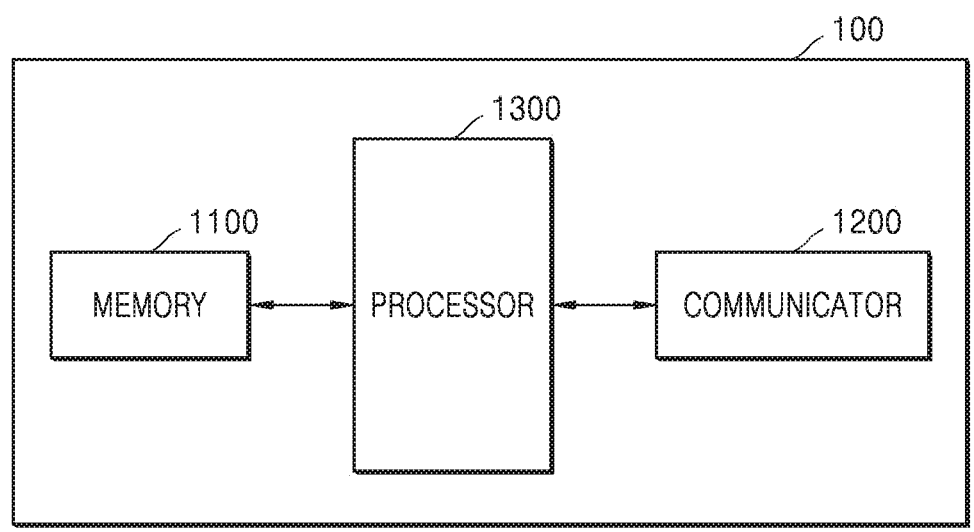
FIGS. 11 and 12 are block diagrams of an electronic device according to some embodiments.
Figure 12:
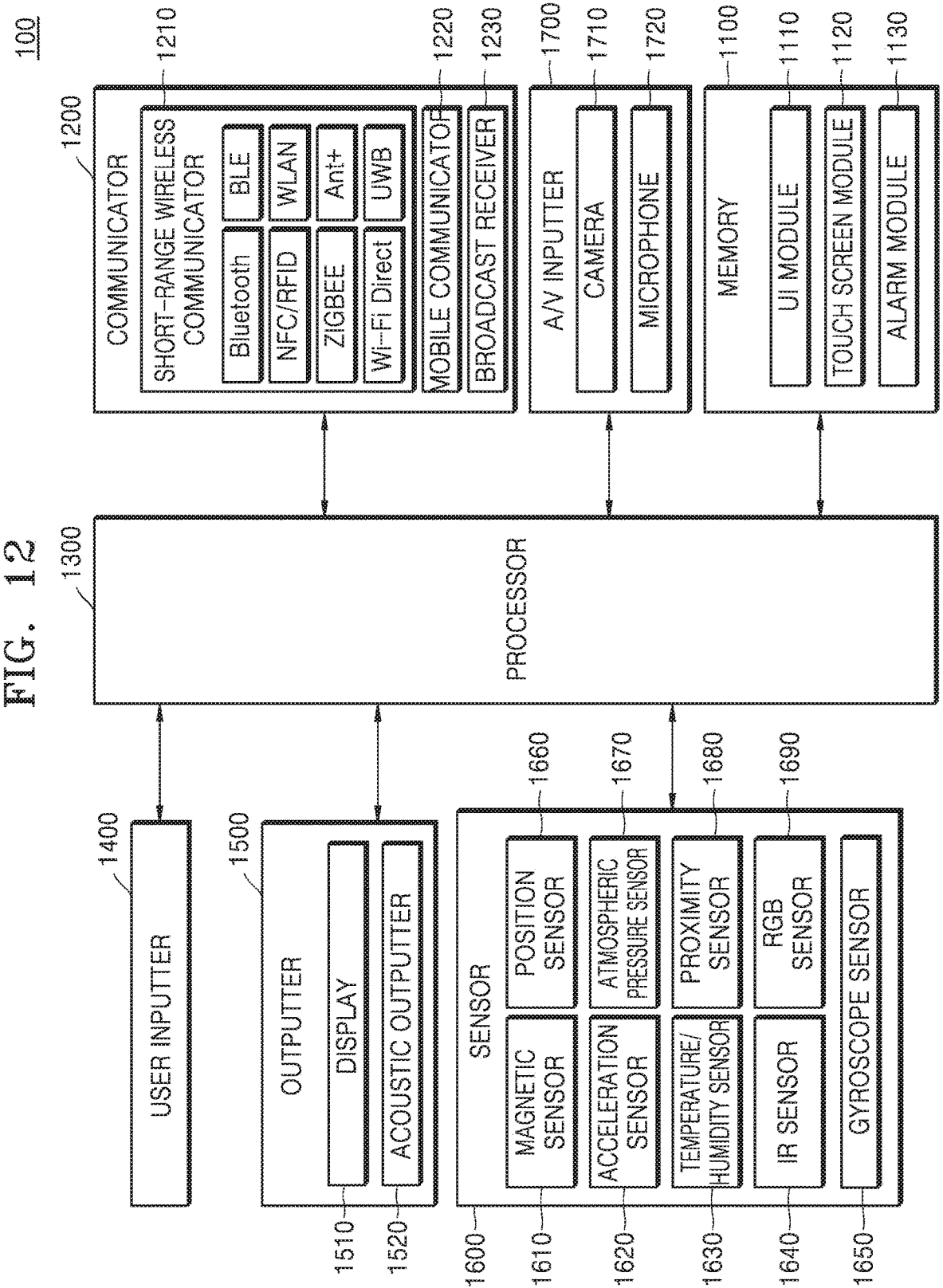

FIGS. 11 and 12 are block diagrams of an electronic device according to some embodiments.

As shown in FIG. 11, according to some embodiments, the electronic device 100 may include a memory 1100, a communication unit 1200, and a processor 1300. However, the electronic device 100 may be implemented by more components than the components shown in FIG. 11. For example, as shown in FIG. 12, the electronic device 100 according to some embodiments may further include a user input unit 1400, an output unit 1500, a sensor 1600, and an audio/video (A/V) input unit 1700 besides the memory 1100, the communication unit 1200, and the processor 1300.

The memory 1100 may store programs for processing and control of the processor 1300 and store data input to the electronic device 100 or output from the electronic device 100.

The memory 1100 may include at least one type of storage medium among a flash memory type memory, a hard disk type memory, a multimedia card micro type memory, a card type memory (e.g., a secure digital (SD) or extreme digital (XD) memory), random access memory (RAM), static RAM (SRAM), read only memory (ROM), electrically erasable programmable ROM (EEPROM), PROM, a magnetic memory, a magnetic disc, and an optical disc.

The programs stored in the memory 1100 may be classified into a plurality of modules according to functions thereof, e.g., a user interface (UI) module 1110, a touch screen module 1120, an alarm module 1130, and the like.

The UI module 1110 may provide a specified UI, a specified graphic UI (GUI), or the like interoperating with the electronic device 100 for each application. The touch screen module 1120 may sense a touch gesture of a user on a touch screen and transmit information about the touch gesture to the processor 1300. According to some embodiments, the touch screen module 1120 may recognize and analyze a touch code. The touch screen module 1120 may be configured by separate hardware including a controller.

The alarm module 1130 may generate a signal for informing of the occurrence of an event of the electronic device 100. Examples of the event occurring in the electronic device 100 may include call signal reception, message reception, key signal input, schedule alarm, and the like. The alarm module 1130 may output an alarm signal in a video signal form through a display 1510 or in an audio signal form through an acoustic output unit 1520.

The communication unit 1200 may include at least one component for communicating between the electronic device 100 and an external device (not shown) and a server 2000. For example, the communication unit 1200 may include a short-range wireless communication unit 1210, a mobile communication unit 1220, and a broadcast reception unit 1230.

The short-range wireless communication unit 1210 may include a Bluetooth communication unit, a Bluetooth low energy (BLE) communication unit, a NFC unit, a wireless local area network (WLAN) (Wi-Fi) communication unit, a Zigbee communication unit, an IrDA communication unit, a WFD communication unit, a UWB communication unit, an Ant+ communication unit, and the like but is not limited thereto.

The mobile communication unit 1220 transmits and receives a wireless signal to and from at least one of a base station, an external terminal, and a server in a mobile communication network. Herein the wireless signal may include a voice call signal, a video call signal, or various types of data according to text/multimedia message transmission and reception.

The broadcast reception unit 1230 receives a broadcast signal and/or broadcast related information from the outside through a broadcast channel. The broadcast channel may include a satellite channel and a terrestrial channel.

In addition, the communication unit 1200 may receive, from at least one external device, context data to be used to determine a state of the user and transmit and receive information required to execute an operation related to replacement and output of an advertisement to and from the server. For example, the communication unit 1200 may receive context data from at least one external device including a refrigerator, a cooking appliance, a mobile device, a wearable device, acoustic equipment, a lighting device, and a sensor connected to the electronic device 100 via a network. In addition, the communication unit 1200 may transmit user state information to the server and receive, from the server, information about a second advertisement determined based on the user state information.

The processor 1300 may commonly control a general operation of the electronic device 100. For example, the processor 1300 may generally control the communication unit 1200, the user input unit 1400, the output unit 1500, the sensor 1600, the A/V input unit 1700, and the like by executing programs stored in the memory 1100. In addition, the processor 1300 may perform the functions of the electronic device 100, which have been described with reference to FIGS. 1 to 10, by executing the programs stored in the memory 1100.

The processor 1300 may acquire user state information indicating a state of the user from context data received from at least one external device, based on a learning model using one or more neural networks. For example, processor 1300 may determine a state of the user by considering data indicating whether cooking appliances acoustic equipment, and home appliances are operating, temperature data and humidity data received from various types of sensors, data indicating an on/off state of a lighting device, voice data of the user, data indicating a current use state of a cellular phone of the user, and the like. For example, the processor 1300 may determine whether the user is hungry at present, is exercising, is cleaning, is preparing food, or the like but is not limited thereto.

In addition, the processor 1300 may learn a state of the user from context data received from an external device by using a learning model stored in the memory 1100 or the server 2000 and acquire user state information indicating a state of the user according to a learning result. This will be described in more detail with reference to FIGS. 15 to 18.

The processor 1300 may perform a control so as to replace a previously determined first advertisement with a second advertisement based on user state information and to output the second advertisement As described above, the first advertisement may indicate an advertisement previously determined by a broadcasting station to be output through the electronic device 100, and the second advertisement is an advertisement targeted at the user and may indicate an advertisement determined to be output instead of the first advertisement.

In addition, according to an embodiment, the processor 1300 may determine the second advertisement by considering not only the user state information but also view history information. Accordingly, the processor 1300 may determine the second advertisement more accurately targeted at the user.

The processor 1300 may recognize a time point when the first advertisement starts and perform a control so as to replace the first advertisement with the second advertisement and to output the second advertisement from the recognized time point. Accordingly, the processor 1300 may prevent changing to the second advertisement in the middle of outputting the first advertisement.

In addition, the processor 1300 may perform a control to continuously output, on a second channel, the second advertisement being output on a first channel, when the second advertisement is output instead on the first channel and a channel is changed from the first channel to the second channel in response to an input of changing the channel. Accordingly, the processor 1300 may allow the user to view the second advertisement from the start to the end thereof, thereby enabling an advertising effect of the second advertisement to be improved.

The user input unit 1400 may indicate a means through which the user inputs data for controlling the electronic device 100. For example, the user input unit 1400 may include a keypad, a dome switch, a touch pad (a capacitive overlay touch pad, a resistive overlay touch pad, an infrared (IR) beam touch pad, a surface acoustic wave touch pad, an integral strain gauge touch pad, a piezoelectric touch pad, or the like), a jog wheel, a jog switch, and the like but is not limited thereto.

The user input unit 1400 may receive the user's input to change a channel to be output through the electronic device 100.

The output unit 1500 may output an audio signal, a video signal, or a vibration signal and may include the display 1510 and the acoustic output unit 1520.

The display 1510 displays information processed by the electronic device 100. For example, the display 1510 may output a broadcast program of a channel selected by the user. In addition, the display 1510 may output the first advertisement previously determined by a broadcasting station to be output through the electronic device 100 and the second advertisement targeted at the user.

The acoustic output unit 1520 may output audio data received through the communication unit 1200 or stored in the memory 1100. In addition, the acoustic output unit 1520 may output an acoustic signal related to a function (e.g., a call signal reception sound, a message reception sound, or an alarm sound) performed by the electronic device 100.

The sensor 1600 may detect a state of the electronic device 100 or an ambient state of the electronic device 100 and transmit the detected information to the processor 1300. The sensor 1600 may be used to generate a portion of data required to determine a state of the user.

The sensor 1600 may include at least one of a magnetic sensor 1610, an acceleration sensor 1620, a temperature/humidity sensor 1630, an IR sensor 1640, a gyroscope sensor 1650, a position sensor (e.g., global positioning system (GPS)) 1660, an atmospheric pressure sensor 1670, a proximity sensor 1680, and an RGB (illuminance) sensor 1690 but is not limited thereto. A function of each sensor may be intuitively inferred by those of ordinary skill in the art from a name thereof, and thus a detailed description thereof is omitted herein.

The A/V input unit 1700 is to input an audio signal or a video signal and may include a camera 1710, a microphone 1720, and the like. The camera 1710 may obtain an image frame of a still image, a moving picture, or the like through an image sensor in a video call mode or a capturing mode. An image captured through the image sensor may be processed by the processor 1300 or a separate image processor (not shown). The image captured through the camera 1710 may be used as data to be used to determine a state of the user.

The microphone 1720 may receive an external acoustic signal and process the external acoustic signal to electrical voice data.

For example, the microphone 1720 may receive an acoustic signal from an external device or the user. The microphone 1720 may receive a voice input of the user. The external acoustic signal received by the microphone 1720 may be used as data to be used to determine a state of the user.

Figure 13:
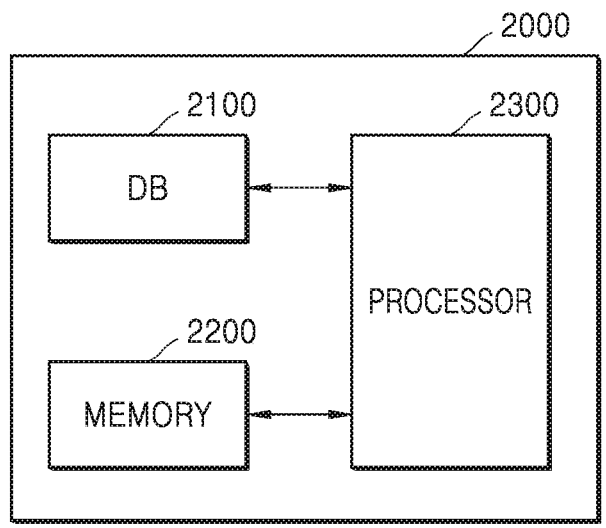
FIG. 13 is a block diagram of a server according to some embodiments.

FIG. 13 is a block diagram of a server according to some embodiments.

Referring to FIG. 13, the server 2000 according to some embodiments may include a database (DB) 2100, a communication unit 2200, and a processor 2300.

The DB 2100 may store context data required to determine a state of a user, and store a learning model using one or more neural networks according to an embodiment.

The communication unit 2200 may include one or more components configured to communicate with the electronic device 100.

The processor 2300 may commonly control a general operation of the server 2000. For example, the processor 2300 may generally control the DB 2100 and the communication unit 2200, and the like by executing programs stored in the DB 2100. The processor 2300 may perform some of the operations of the electronic device 100 with reference to FIGS. 1 to 10 by executing programs stored in the DB 2100.

The processor 2300 may perform a function of determining a state of the user by using the learning model using the one or more neural networks and manage context data to be used to determine a state of the user.

Figure 14:
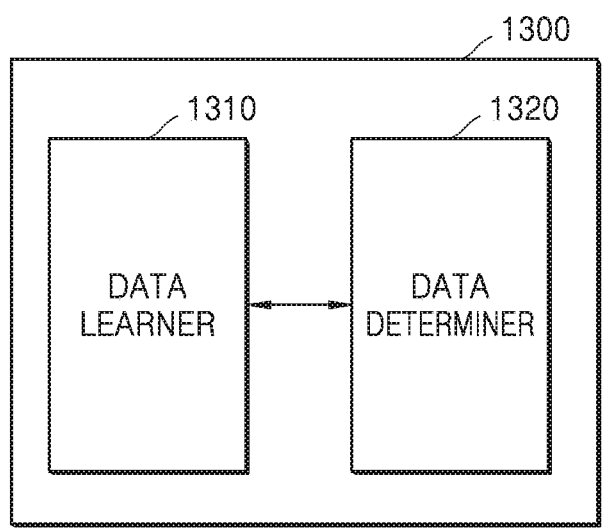
FIG. 14 is a block diagram of a processor according to some embodiments.

FIG. 14 is a block diagram of a processor according to some embodiments.

Referring to FIG. 14, the processor 1300 according to some embodiments may include a data learner 1310 and a data determiner 1320.

The data learner 1310 may learn a reference to determine a state of a user. The data learner 1310 may learn a reference regarding which context data is to be used to determine a state of the user. In addition, the data learner 1310 may learn a reference regarding how to determine a state of the user by using context data. The data learner 1310 may learn a reference to determine a state of the user by acquiring data to be used for the learning and applying the acquired data to a data recognition model to be described below.

The data determiner 1320 may determine a state of the user based on context data and generate user state information indicating the state of the user. The data determiner 1320 may determine a state of the user from predetermined context data by using a learned data recognition model and generate user state information. The data determiner 1320 may acquire predetermined context data according to a reference preset by the learning and use the data recognition model by using the acquired context data as an input value. In addition, the data determiner 1320 may determine a state of the user based on predetermined context data by using the data recognition model. In addition, a result value output by the data recognition model by using the acquired context data as an input value may be used to update the data recognition model.

At least one of the data learner 1310 and the data determiner 1320 may be manufactured in a form of at least one hardware chip and equipped in an electronic device. For example, at least one of the data learner 1310 and the data determiner 1320 may be manufactured in a form of exclusive hardware chip for an artificial intelligence (AI), or manufactured as a part of an existing general-use processor (e.g., a central processing unit (CPU) or an application processor) or a graphic exclusive processor (e.g., a graphic processing unit (GPU)) and may be equipped in various types of electronic devices described above.

In this case, the data learner 1310 and the data determiner 1320 may be equipped in one electronic device or respectively equipped in individual electronic devices. For example, one of the data learner 1310 and the data determiner 1320 may be included in an electronic device, and the other one may be included in a server. In addition, in a wired or wireless manner between the data learner 1310 and the data determiner 1320, model information constructed by the data learner 1310 may be provided to the data determiner 1320, and data input to the data determiner 1320 may be provided as additional learning data to the data learner 1310.

Alternatively, at least one of the data learner 1310 and the data determiner 1320 may be implemented as a software module. When at least one of the data learner 1310 and the data determiner 1320 is implemented as a software module (or a program module including instructions), the software module may be stored in a non-transitory computer-readable recording medium. In addition, in this case, at least one software module may be provided by an operating system (OS) or a certain application. Alternatively, a part of the at least one software module may be provided by the OS, and the other part may be provided by the certain application.

Figure 15:
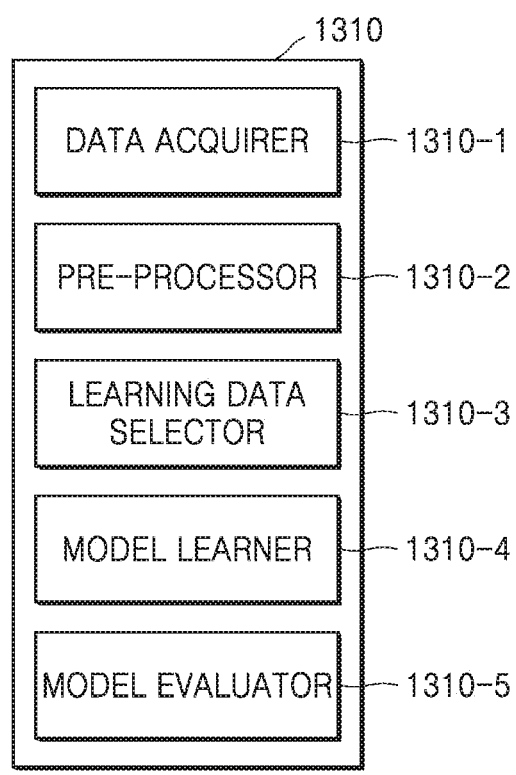
FIG. 15 is a block diagram of a data learner according to some embodiments.

FIG. 15 is a block diagram of a data learner according to some embodiments.

Figure 16:
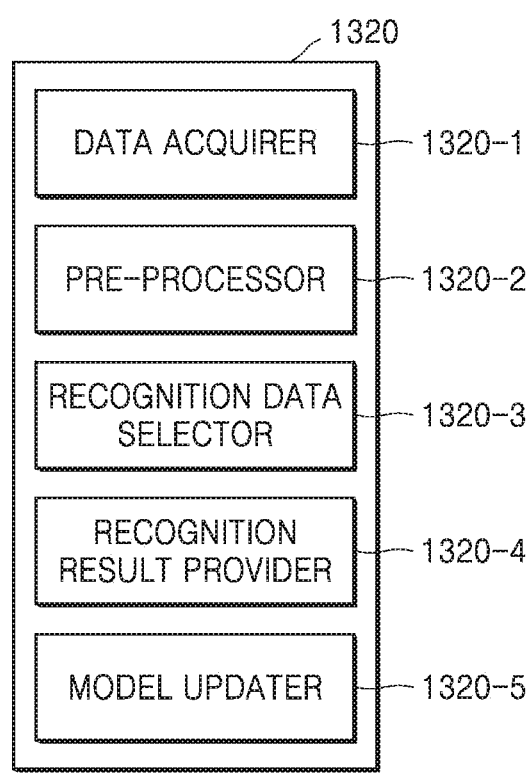
FIG. 16 is a block diagram of a data recognizer according to some embodiments.

Referring to FIG. 16, the data learner 1310 according to some embodiments may include a data acquirer 1310-1, a pre-processor 1310-2, a training data selector 1310-3, a model learner 1310-4, and a model evaluator 1310-5.

The data acquirer 1310-1 may acquire context data required to determine a state of a user and context data required for learning to determine the state of the user.

The data acquirer 1310-1 may acquire context data from at least one external device connected to the electronic device 100 via a network.

The pre-processor 1310-2 may pre-process the acquired context data such that the acquired context data is used for learning to determine a state of the user. The pre-processor 1310-2 may process the acquired context data in a preset format such that the model learner 1310-4 to be described below uses the acquired context data for learning to determine a state of the user.

The learning data selector 1310-3 may select context data required for learning from among the pre-processed context data. The selected context data may be provided to the model learner 1310-4. The learning data selector 1310-3 may select context data required for learning from among the pre-processed context data according to a preset reference for user state determination. Alternatively, the learning data selector 1310-3 may select context data according to a reference preset by learning in the model learner 1310-4 to be described below.

The model learner 1310-4 may learn, based on learning data, a reference regarding how to determine a state of the user. For example, the model learner 1310-4 may learn an associative relationship between learning data and a state of the user. In addition, the model learner 1310-4 may learn a reference regarding which context data is to be used to determine a state of the user In addition, the model learner 1310-4 may learn a data recognition model to be used to determine a state of the user, by using learning data. In this case, the data recognition model may be previously constructed. For example, the data recognition model may be a model previously constructed by receiving basic learning data (e.g., sample data and the like).

The data recognition model may be constructed by considering an application field of the recognition model, a purpose of learning, a computing performance of a device, or the like The data recognition model may be a model based on a neural network. For example, a deep neural network (DNN), a recurrent neural network (RNN), a bidirectional recurrent deep neural network (BRDNN), or the like may be used as the data recognition model, but the data recognition model is not limited thereto.

According to various embodiments, when there exist a plurality of pre-constructed data recognition models, the model learner 1310-4 may determine, as a data recognition model to be learned, a data recognition model having a high relation of basic learning data with input learning data. In this case, the basic learning data may be pre-classified for each data type, and the data recognition models may be pre-classified for each data type. For example, the basic learning data may be pre-classified based on various references such as a generation region of learning data, a generation time of the learning data, a size of the learning data, a genre of the learning data, a generator of the learning data, and a type of an object in the learning data.

Alternatively, the model learner 1310-4 may learn the data recognition model by using, for example, a learning algorithm including error back-propagation or gradient descent.

Alternatively, the model learner 1310-4 may learn the data recognition model through, for example, supervised learning of which an input value is learning data. Alternatively, the model learner 1310-4 may learn the data recognition model through, for example, unsupervised learning by which a reference for determining a state of the user is discovered by learning, by the model learner 1310-4, a type of data required to determine a state of the user without a separate supervision. Alternatively, the model learner 1310-4 may learn the data recognition model through, for example, reinforcement learning using a feedback on whether a result of determining a state of the user according to learning is right.

In addition, when the data recognition model is learned, the model learner 1310-4 may store the learned data recognition model. In this case, the model learner 1310-4 may store the learned data recognition model in a memory of a device including the data determiner 1320. Alternatively, the model learner 1310-4 may store the learned data recognition model in a memory of a device including the data determiner 1320 to be described below. Alternatively, the model learner 1310-4 may store the learned data recognition model in a memory of a server connected to an electronic device via a wired or wireless network.

In this case, the memory in which the learned data recognition model is stored may also store, for example, a command or data related to at least one other component of the device. In addition, the memory may store software and/or programs. The programs may include, for example, a kernel, middleware, an application programming interface (API) and/or application programs (or "applications").

The model evaluator 1310-5 may input evaluation data to the data recognition model, and when a recognition result output based on the evaluation data does not satisfy a certain reference, the model evaluator 1310-5 may allow the model learner 1310-4 to perform learning again. In this case, the evaluation data may be preset data for evaluating the data recognition model.

For example, when a number or percentage of pieces of evaluation data of which a recognition result is not correct among recognition results of the learned data recognition model for the evaluation data exceeds a preset threshold, the model evaluator 1310-5 may evaluate that the certain reference is not satisfied. For example, when the certain reference is defined as 2%, when the learned data recognition model outputs wrong recognition results for more than 20 pieces of evaluation data among a total of 1000 pieces of evaluation data, the model evaluator 1310-5 may evaluate that the learned data recognition model is not suitable.

When there exist a plurality of learned data recognition models, the model evaluator 1310-5 may evaluate whether each learned data recognition model satisfies the certain reference and determine a model satisfying the certain reference as a final data recognition model. In this case, when a plurality of models satisfy the certain reference, the model evaluator 1310-5 may determine, as the final data recognition model, any one model or a certain number of models preset in an order of higher evaluation score.

At least one of the data acquirer 1310-1, the pre-processor 1310-2, the learning data selector 1310-3, the model learner 1310-4, and the model evaluator 1310-5 in the data learner 1310 may be manufactured in a form of at least one hardware chip and equipped in an electronic device. For example, at least one of the data acquirer 1310-1, the pre-processor 1310-2, the learning data selector 1310-3, the model learner 1310-4, and the model evaluator 1310-5 may be manufactured in a form of exclusive hardware chip for an AI, or manufactured as a part of an existing general-use processor (e.g., a CPU or an application processor) or a graphic exclusive processor (e.g., a GPU) and may be equipped in various types of electronic devices described above.

In addition, the data acquirer 1310-1, the pre-processor 1310-2, the learning data selector 1310-3, the model learner 1310-4, and the model evaluator 1310-5 may be equipped in one electronic device or respectively equipped in individual electronic devices. For example, some of the data acquirer 1310-1, the pre-processor 1310-2, the learning data selector 1310-3, the model learner 1310-4, and the model evaluator 1310-5 may be included in an electronic device, and the other some may be included in a server.

Alternatively, at least one of the data acquirer 1310-1, the pre-processor 1310-2, the learning data selector 1310-3, the model learner 1310-4, and the model evaluator 1310-5 may be implemented as a software module. When at least one of the data acquirer 1310-1, the pre-processor 1310-2, the learning data selector 1310-3, the model learner 1310-4, and the model evaluator 1310-5 is implemented as a software module (or a program module including instructions), the software module may be stored in a non-transitory computer-readable recording medium. In addition, in this case, at least one software module may be provided by an OS or a certain application. Alternatively, a part of the at least one software module may be provided by the OS, and the other part may be provided by the certain application.

FIG. 16 is a block diagram of a data recognizer according to some embodiments.

Referring to FIG. 16, the data determiner 1320 according to some embodiments may include a data acquirer 1320-1, a pre-processor 1320-2, a recognition data selector 1320-3, a recognition result provider 1320-4, and a model updater 1320-5.

The data acquirer 1320-1 may acquire data required to determine a state of a user, and the pre-processor 1320-2 may pre-process the acquired data such that the acquired data is used to determine a state of the user. The pre-processor 1320-2 may process the acquired data in a preset format such that the recognition result provider 1320-4 to be described below uses the acquired data to determine a state of the user. For example, the data acquirer 1320-1 may acquire context data from at least one external device connected to the electronic device 100 via a network Alternatively, for example, the context data may be generated by the electronic device 100 or received from an external device.

The recognition data selector 1320-3 may select, from among the pre-processed data, data required to determine a state of the user. The selected data may be provided to the recognition result provider 1320-4. The recognition data selector 1320-3 may select a part or all of the pre-processed data according to a preset reference for determining a state of the user. Alternatively, the recognition data selector 1320-3 may select data according to a reference preset by learning in the model learner 1310-4 to be described below.

The recognition result provider 1320-4 may determine a state of the user by applying the selected data to a data recognition model. The recognition result provider 1320-4 may provide a recognition result according to a recognition purpose of the data. The recognition result provider 1320-4 may apply the selected data to the data recognition model by using the data selected by the recognition data selector 1320-3 as an input value. In addition, the recognition result may be determined by the data recognition model.

The model updater 1320-5 may update the data recognition model based on an evaluation on the recognition result provided by the recognition result provider 1320-4. For example, the model updater 1320-5 may allow the model learner 1310-4 to update the data recognition model by providing the recognition result provided by the recognition result provider 1320-4 to the model learner 1310-4.

At least one of the data acquirer 1320-1, the pre-processor 1320-2, the recognition data selector 1320-3, the recognition result provider 1320-4, and the model updater 1320-5 in the data determiner 1320 may be manufactured in a form of at least one hardware chip and equipped in an electronic device. For example, at least one of the data acquirer 1320-1, the pre-processor 1320-2, the recognition data selector 1320-3, the recognition result provider 1320-4, and the model updater 1320-5 may be manufactured in a form of exclusive hardware chip for an AI, or manufactured as a part of an existing general-use processor (e.g., a CPU or an application processor) or a graphic exclusive processor (e.g., a GPU) and may be equipped in various types of electronic devices described above.

In addition, the data acquirer 1320-1, the pre-processor 1320-2, the recognition data selector 1320-3, the recognition result provider 1320-4, and the model updater 1320-5 may be equipped in one electronic device or respectively equipped in individual electronic devices. For example, some of the data acquirer 1320-1, the pre-processor 1320-2, the recognition data selector 1320-3, the recognition result provider 1320-4, and the model updater 1320-5 may be included in the electronic device 100, and the other some may be included in a server.

Alternatively, at least one of the data acquirer 1320-1, the pre-processor 1320-2, the recognition data selector 1320-3, the recognition result provider 1320-4, and the model updater 1320-5 may be implemented as a software module. When at least one of the data acquirer 1320-1, the pre-processor 1320-2, the recognition data selector 1320-3, the recognition result provider 1320-4, and the model updater 1320-5 is implemented as a software module (or a program module including instructions), the software module may be stored in a non-transitory computer-readable recording medium. In addition, in this case, at least one software module may be provided by an OS or a certain application.

Alternatively, a part of the at least one software module may be provided by the OS, and the other part may be provided by the certain application.

Figure 17:
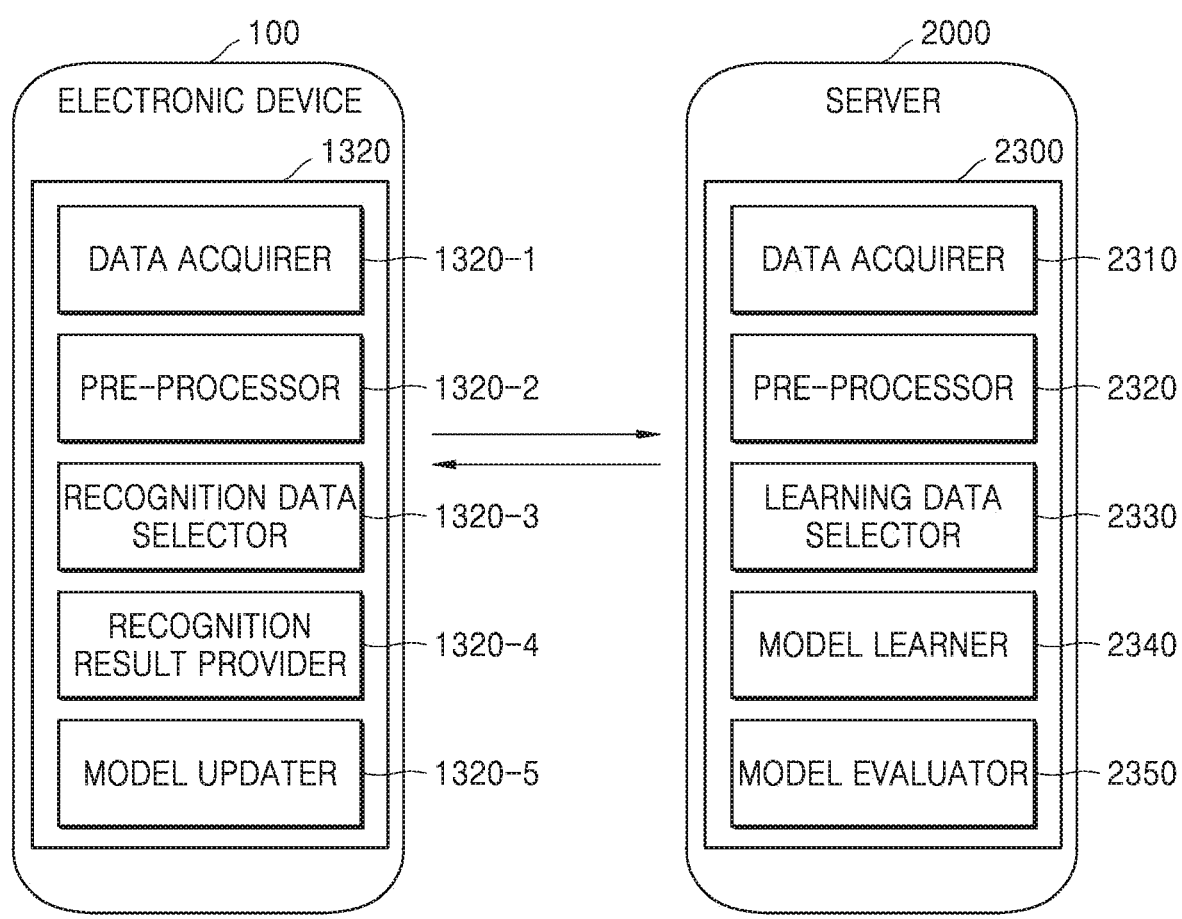
FIG. 17 illustrates an example of learning and recognizing data according to linking between an electronic device and a server, according to some embodiments.

FIG. 17 illustrates an example of learning and recognizing data according to linking between an electronic device and a server, according to some embodiments.

Referring to FIG. 17, the server 2000 may learn a reference for determining a state of a user, and the electronic device 100 may determine an intention of the user, provision of associated information, and recommendation of a replaced operation based on a result of the learning by the server 2000.

In this case, a model learner 2340 of the server 2000 may perform the function of the data learner 1310 shown in FIG. 15. The model learner 2340 of the server 2000 may learn a reference regarding which data is to be used to determine a state of the user. In addition, the model learner 2340 of the server may learn a reference regarding how to determine a state of the user by using the data. The model learner 2340 may acquire data to be used for the learning, and learn a reference for determining a state of the user by applying the acquired data to a data recognition model to be described below.

In addition, the recognition result provider 1320-4 of the electronic device 100 may determine a state of the user by applying data selected by the recognition data selector 1320-3 to a data recognition model generated by the server 2000. For example, the recognition result provider 1320-4 may transmit the data selected by the recognition data selector 1320-3 to the server 2000 and request the server to determine a state of the user by applying the data selected by the recognition data selector 1320-3 to the recognition model.

Alternatively, the recognition result provider 1320-4 of the electronic device 100 may receive the recognition model generated by the server 2000 from the server 2000, and determine a state of the user by using the received recognition model. In this case, the recognition result provider 1320-4 of the device 1000 may determine a state of the user by applying the data selected by the recognition data selector 1320-3 to the data recognition model received from the server 2000.

In addition, the electronic device 100 and the server 2000 may effectively distribute and perform tasks for learning and data recognition of a data recognition model, and through the distribution and performance, the electronic device 100 and the server 2000 may efficiently process data to provide a service suitable for an intention of the user and effectively protect the privacy of the user.

Some embodiments may be implemented in a form of a recording medium including computer-executable instructions such as a program module executed by a computer system. A computer-readable medium may be an arbitrary available medium which may be accessed by a computer system and includes all types of volatile and non-volatile media and separated and non-separated media. In addition, the computer-readable medium may include all types of computer storage media and communication media. The computer storage media include all types of volatile and non-volatile and separated and non-separated media implemented by an arbitrary method or technique for storing information such as computer-readable instructions, a data structure, a program module, or other data. The communication media typically include computer-readable instructions, a data structure, a program module, other data of a modulated signal such as a carrier, other transmission mechanism, and arbitrary information delivery media.

In addition, in the present specification, "unit, interface, or -er(or)" may indicate a hardware component such as a processor or a circuit and/or a software component executed by a hardware component such as a processor.

The embodiments of the present disclosure described above are only illustrative, and it will be understood by those of ordinary skill in the art that various changes in form and details may be made therein without changing the technical spirit and mandatory features of the disclosure. Therefore, the embodiments of the disclosure should be understood in the illustrative sense only and not for the purpose of limitation in all aspects. For example, each component described as a single type may be carried out by being distributed, and likewise, components described as a distributed type may also be carried out by being coupled.

While one or more embodiments of the disclosure have been described with reference to the figures, it will be understood by those of ordinary skill in the art that various changes in form and details may be made therein without departing from the spirit and scope as defined by the following claims.

The invention claimed is:

1. An electronic device comprising:
   a memory storing at least one program;
   a transceiver configured to receive context data to be used to determine a state of a user, from at least one external device; and
   a processor configured to replace and output an advertisement by executing the at least one program,
   wherein the at least one program comprises instructions to:
      acquire user state information indicating the state of the user from the received context data, based on a learning model using one or more neural networks;
      transmit the user state information to an external server;
      receive, from the external server, information about a second advertisement determined based on the user state information; and
      perform control to replace a previously determined first advertisement with the second advertisement based on the received information about the second advertisement and to output the second advertisement.

2. The electronic device of claim 1, wherein the first advertisement is an advertisement previously determined by a broadcasting station to be output through the electronic device, and the second advertisement is an advertisement determined to be output instead of the first advertisement, as an advertisement targeted at the user.

3. The electronic device of claim 1, wherein the learning model is determined by learning the state of the user in response to an input of the context data to the one or more neural networks.

4. The electronic device of claim 3, wherein the learning model is updated when the at least one external device connected to the electronic device is changed.

5. The electronic device of claim 1, wherein the user state information is differently determined according to at least one of a type of the at least one external device, a state of the at least one external device, or a value of the context data.

6. The electronic device of claim 1,
   wherein the at least one program further comprises instructions to acquire view history information, and
   wherein the second advertisement is determined based on the user state information and the view history information.

7. The electronic device of claim 1, wherein the at least one external device comprises at least one of a home appliance, a cooking appliance, a mobile device, a wearable device, acoustic equipment, exercise equipment, a lighting device, or a sensor connected to the electronic device via a network.

8. The electronic device of claim 1, wherein the instructions to perform the control to replace with the second advertisement and output the second advertisement comprise:
   instructions to recognize a time point when the first advertisement starts; and
   instructions to perform control to replace the first advertisement with the second advertisement and output the second advertisement from the recognized time point.

9. The electronic device of claim 1, wherein the second advertisement is determined based on price information transmitted from each of one or more advertisers accessing the external server.

10. The electronic device of claim 1, wherein the at least one program further comprises instructions to:
    receive an input of changing a channel; and
    perform control to continuously output, on a second channel, the second advertisement being output on a first channel, when the channel is changed from the first channel to the second channel in response to the received input.

11. A method, performed by an electronic device, of replacing and outputting an advertisement, the method comprising:
    receiving context data used to determine a state of a user from at least one external device;
    acquiring user state information indicating the state of the user from the received context data, based on a learning model using one or more neural networks;
    transmitting the user state information to an external server;
    receiving, from the external server, an information about a second advertisement determined based on the user state information; and
    performing control to replace a pre-determined first advertisement with the second advertisement based on the received information about the second advertisement and outputting the second advertisement.

12. The method of claim 11, wherein the first advertisement is an advertisement previously determined by a broadcasting station to be output through the electronic device, and the second advertisement is an advertisement determined to be output instead of the first advertisement, as an advertisement targeted at the user.

13. The method of claim 11, wherein the learning model is determined by learning the state of the user in response to an input of the context data to the one or more neural networks.

14. The method of claim 11, further comprising:
    acquiring view history information,
    wherein the second advertisement is determined based on the user state information and the view history information.

15. The method of claim 11, wherein the at least one external device comprises at least one of a home appliance, a cooking appliance, a mobile device, a wearable device, acoustic equipment, exercise equipment, a lighting device, or a sensor connected to the electronic device via a network.

16. The method of claim 11, wherein the performing of the control to replace with the second advertisement and output the second advertisement comprises:

recognizing a time point when the first advertisement starts; and performing control to replace the first advertisement with the second advertisement and output the second advertisement from the recognized time point.

17. The method of claim 11, further comprising:

receiving an input of changing a channel; and performing control to continuously output, on a second channel, the second advertisement being output on a first channel, when the channel is changed from the first channel to the second channel in response to the received input.

18. A non-transitory computer-readable recording medium having recorded thereon a program for executing, in a computer, the method of claim 11.

\* \* \* \* \*